United States Patent
Blarre et al.

(10) Patent No.: US 12,451,221 B2
(45) Date of Patent: Oct. 21, 2025

(54) SYSTEMS AND METHODS FOR MODEL-ASSISTED DATA PROCESSING TO PREDICT BIOMARKER STATUS AND TESTING DATES

(71) Applicant: Flatiron Health, Inc., New York, NY (US)

(72) Inventors: Auriane Blarre, New York, NY (US); Prakrit Baruah, Boston, MA (US); Guy Amster, Hoboken, NJ (US); Benjamin Irvine, Brooklyn, NY (US); Alexander Rich, Brooklyn, NY (US); Sabri Eyuboglu, Palo Alto, CA (US)

(73) Assignee: Flatiron Health, Inc., New York, NY (US)

(*) Notice: Subject to any disclaimer, the term of this patent is extended or adjusted under 35 U.S.C. 154(b) by 0 days.

(21) Appl. No.: 18/082,344

(22) Filed: Dec. 15, 2022

(65) Prior Publication Data
US 2023/0197220 A1    Jun. 22, 2023

Related U.S. Application Data

(60) Provisional application No. 63/290,427, filed on Dec. 16, 2021.

(51) Int. Cl.
*G16H 10/60* (2018.01)
*G06N 3/08* (2023.01)

(52) U.S. Cl.
CPC ............ *G16H 10/60* (2018.01); *G06N 3/08* (2013.01)

(58) Field of Classification Search
CPC ................................ G16H 10/60; G06N 3/08
See application file for complete search history.

(56) References Cited

U.S. PATENT DOCUMENTS

| 10,325,020 B2 * | 6/2019 | Burke | ................... G16H 50/70 |
| 10,831,811 B2 * | 11/2020 | Kraus | ................. G06F 16/3346 |

(Continued)

OTHER PUBLICATIONS

International Search Report and Written Opinion issued in PCT Application No. PCT/US2022/053032 dated Apr. 24, 2023 (13 pages).

(Continued)

*Primary Examiner* — Jay M. Patel
(74) *Attorney, Agent, or Firm* — Wolf, Greenfield & Sacks, P.C.

(57) ABSTRACT

A model-assisted system for processing data to extract a patient event date may include a processor. The processor may be programmed to access a database storing a medical record associated with a patient, the medical record comprising unstructured data; analyze the unstructured data to identify a plurality of dates represented in at least one document included in the medical record; identify a plurality of snippets of information included in the at least one document, each snippet of the plurality of snippets being associated with a date of the plurality of dates; inputting the plurality of snippets into a machine learning model, the machine learning model having been trained to determine associations between dates and patient events based on a training set of snippet data; and determine whether each date of the plurality of dates is associated with a patient event based on an output of the machine learning model.

21 Claims, 17 Drawing Sheets

(56) References Cited

U.S. PATENT DOCUMENTS

| | | | | |
|---|---|---|---|---|
| 2004/0078228 | A1* | 4/2004 | Fitzgerald | G16H 10/60 |
| | | | | 705/2 |
| 2008/0301122 | A1* | 12/2008 | Almeida | G06Q 10/02 |
| | | | | 707/999.005 |
| 2018/0225680 | A1* | 8/2018 | Wilson | G06Q 30/0201 |
| 2018/0300640 | A1 | 10/2018 | Birnbaum et al. | |
| 2019/0131016 | A1* | 5/2019 | Cohen | A61B 6/032 |
| 2020/0272919 | A1* | 8/2020 | Haimson | G16H 50/20 |
| 2021/0027894 | A1 | 1/2021 | Rich et al. | |
| 2021/0090747 | A1 | 3/2021 | Birnbaum et al. | |
| 2021/0109892 | A1* | 4/2021 | Groff | G06F 16/248 |
| 2021/0109915 | A1* | 4/2021 | Godden | G16H 10/60 |
| 2021/0118528 | A1 | 4/2021 | Addison et al. | |
| 2021/0216725 | A1* | 7/2021 | Li | G06N 3/048 |
| 2021/0313051 | A1* | 10/2021 | Asselmann | G16H 40/67 |
| 2021/0313052 | A1* | 10/2021 | Makrinich | G11B 27/34 |
| 2021/0342785 | A1* | 11/2021 | Mann | G06F 40/186 |
| 2022/0400943 | A1* | 12/2022 | Lee | A61B 3/102 |

OTHER PUBLICATIONS

Zhao Jason et al., "Machine Learning for Healthcare Directing Human Attention in Event Localization for Clinical Timeline Creation," Proceedings of Machine Learning Research, Jan. 1, 2021, pp. 1-22, retrieved from URL: https://proceedings.mlr.press/v149/zhao21a/zhao21a.pdf.

* cited by examiner

400A

Biomarkers

Structured biomarker in EMR ⓘ

| EGFR | Positive<br>Lab: 2/14/2019 |
| --- | --- |
|  | Wildtype<br>staging: 11/15/2016 |
| ALK | Negative<br>Staging: 11/15/2016 |

Inferred genomic testing status from EMR ⓘ
Patient has had genomic testing     Likely
View document     02/19/2019
⊗ Confirm patient has had genomic testing    <u>Tested</u>   Not tested

Research team captured biomarker(s) ⓘ
⊕ Provide biomarker status for patient matching

Drug order history

| Carboplatin | First Order: 01/02/2029<br>Last Order: 02/10/2019 |
| --- | --- |

Biomarkers — 402

Structured biomarker in EMR ⓘ

| | |
|---|---|
| EGFR | Positive<br>Lab: 2/14/2019 |
| | Wildtype<br>staging: 11/15/2016 |
| ALK | Negative<br>Staging: 11/15/2016 |

404

Inferred genomic testing status from EMR ⓘ

Patient has had genomic testing     Verified by user as tested
View document     last update by
Edit genomic testing status ✏     janedoe@flatiron.com
    06/15/2018

406

Research team captured biomarker(s) ⓘ

⊗ Patient is confirmed to have been tested for this biomarker:

| *Select biomarker ⇕ | *Enter result date 📅 |
|---|---|
| *Provide test result ⇕ | Additional description |
| Select test vendor ⇕ | Select test type ⇕ |

— 406B

Add to patient profile — 406C

408

Drug order history

Carboplatin     First Order: 01/02/2029
    Last Order: 02/10/2019

Biomarkers — 402

Structured biomarker in EMR ⓘ

EGFR　　　　　　　　　　　　　　Positive
　　　　　　　　　　　　　　Lab: 2/14/2019

Wildtype
　　　　　　　　　　　　staging: 11/15/2016

ALK　　　　　　　　　　　　　　Negative
　　　　　　　　　　　　Staging: 11/15/2016

— 404

Inferred genomic testing status from EMR ⓘ
Patient has had genomic testing　　Verified by user as tested
View document　　　　　　　　　　　last update by
Edit genomic testing status ✎　　janedoe@flatiron.com
　　　　　　　　　　　　　　　　　　06/15/2018

— 406

Research team captured biomarker(s) ⓘ
Last update by janedoe@flatiron.com on 02/25/2019

EGFR ✎　　　　　　　　　　　　　　Wildtype
Comprehensive Genomic Profiling (CGP)　Result date: 02/24/2019
　　　　　　　　　　　　　　　　　　— 406D ⊕ Provide biomarker status for patient matching — 406A

— 408

Drug order history

Carboplatin　　　　　　　　First Order: 01/02/2029
　　　　　　　　　　　　　　Last Order: 02/10/2019

Biomarkers — 402

Structured biomarker in EMR ⓘ

EGFR    Positive
        Lab: 2/14/2019

Wildtype
        staging: 11/15/2016

ALK     Negative
        Staging: 11/15/2016

404 — Inferred genomic testing status from EMR ⓘ

Patient has had genomic testing    Verified by user as tested
View document                       last update by
Edit genomic testing status ✎       janedoe@flatiron.com
                                    06/15/2018

406 — Research team captured biomarker (1) ⓘ

Last update by janedoe@flatiron.com on 02/25/2019

EGFR ✎                                          Wildtype
Comprehensive Genomic Profiling (CGP)   Result date: 02/24/2019     — 406D ⊗ Patient is confirmed to have been tested for this biomarker:

| *Select biomarker ⇅ | 02/24/2019 📅 |
| *Provide test result ⇅ | Additional description |
| * Provide test entity ⇅ | Select test type ⇅ |

— 406E
                                                                    — 406C

Add to patient profile

408 — Drug order history

Carboplatin                         First Order: 01/02/2029
                                    Last Order: 02/10/2019

Biomarkers

Structured biomarker in EMR ⓘ

EGFR — Positive
Lab: 2/14/2019

Wildtype
staging: 11/15/2016

ALK — Negative
Staging: 11/15/2016

Inferred genomic testing status from EMR ⓘ

Patient has had genomic testing   Verified by user as tested
View document                      last update by
Edit genomic testing status ✏      janedoe@flatiron.com
                                   06/15/2018

Research team captured biomarker(s) ⓘ
Last update by janedoe@flatiron.com on 02/25/2019

EGFR ✏                              Wildtype
Comprehensive Genomic Profiling (CGP)   Result date: 02/24/2019

PD-L1 ✏                             High (>=50%)
Immunohistochemistry (IHC)          Dako 22c3
                                    result delivered: 02/24/2019

⊕ Provide biomarker status for patient matching

Drug order history

Carboplatin                        First Order: 01/02/2029
                                   Last Order: 02/10/2019

| ≡ | Trials Patients Feasibility Reports | 🔍 Search 👤 Jane Doe |

602 — Feasibility analysis
604 — Demographic and visit criteria
Genders
[Any genders ▼]    ☐ Exclude deceased patients   ☐ Include new patients only ⓘ
Locations                           Visits between
[Any locations ▼]    [📅] and [📅]
Age
[Age minimum]  [Age maximum]

606 — Diagnostic criteria
Diagnoses                           Stages
[Any disease ▼]                         [Any stages ▼]
Genomic testing statuses ⓘ          Metastatic statuses ⓘ
[Any testing statuses ▼]                [Any metastatic statuses ▼]
Biomarkers ⓘ
☑ Include research team captured biomarker(s)
[Any of ▼]
[BRAF ▼]  [Selected result ▼]

608 — Treatment related criteria
Inclusionary drugs                  Exclusionary drugs
[All of ▼]                              [None of ▼]
[Any drugs ▼]                           [Any drugs ▼]
Medication orders after             Medication orders after
[      📅]                              [      📅]

610 — [ Apply ]

Feasibility analysis

— Demographic and visit criteria

Genders
[Any genders ▼]

☐ Exclude deceased patients  ☐ Include new patients only ⓘ

Visits between
[_____ 📅] and [_____ 📅]

Locations
[Any locations ▼]

Age
[Age minimum] [Age maximum]

— Diagnostic criteria

Diagnoses
[Non-small cell lung cancer ▼]

Stages
[Any stages ▼]

Genomic testing statuses ⓘ
[Tested only ▼]

Metastatic statuses ⓘ
[Metastatic only ▼]

Biomarkers ⓘ
☑ Include research team captured biomarker(s)
[Any of ▼]
[BRAF ▼] [Selected result ▼]
⊕ Add another biomarker criteria — Treatment related criteria

Inclusionary drugs
[All of ▼]
[Any drugs ▼]

Exclusionary drugs
[None of ▼]
[Any drugs ▼]

Medication orders after
[_____ 📅]

Medication orders after
[_____ 📅]

[ Apply ]

Patients matching criteria (3)
Research team captured data | ML inference    614    Showing all of 3 patients >>|

| ☐ | Patient | Diagnosis | Primary physician | Location | Current status on trial(s) |
|---|---------|-----------|-------------------|----------|----------------------------|
| ☐ | Jane Johnson | Non-small cell lung | Smith, Carol | East clinic | BRE-0015  ● Active |

| | Patient | Diagnosis | Primary physician | Location | Current status on trial(s) | |
|---|---|---|---|---|---|---|
| ☐ | Jane Johnson | Non-small cell lung | Smith, Carol | East clinic | BRE-0015 | ● Active |
| ☐ | Genelle Larson | Breast Cancer | Klocko, Dagmar | South Aletha | ORM-2321 | ◐ Pending |
| ☐ | Christina Weissnat | Breast Cancer | Barrows, Aurelia | Cancer Specialists | ORM-2321 | ● Inactive |

Patients matching critera (3) — Research team captured data | ML inference — 614 — Showing all of 3 patients >>|

Trials  Patients  Feasibility  Reports      Search  Jane Doe

*FIG. 6C*

SYSTEMS AND METHODS FOR MODEL-ASSISTED DATA PROCESSING TO PREDICT BIOMARKER STATUS AND TESTING DATES

CROSS REFERENCE TO RELATED APPLICATION

This application is based on and claims the benefit of priority of U.S. Provisional Application No. 63/290,427, filed on Dec. 16, 2021. The contents of the foregoing application are incorporated herein by reference in their entirety.

BACKGROUND

Technical Field

The present disclosure relates to date processing for medical records and, more specifically, to the extraction of key dates and other information from unstructured medical data using artificial intelligence.

Background Information

In today's health care system, analyzing patient diagnosis, treatment, testing, and other healthcare data across large populations of patients can provide helpful insights for understanding diseases, for the development of new forms of therapies and treatments, and for evaluating the efficacy of existing therapies and treatments. In particular, it may be helpful to identify particular dates associated with key events or stages within the course of a patient's diagnosis and/or treatment. For example, it may be beneficial for researchers to identify patients diagnosed with a particular disease as well as the date at which the disease was diagnosed or a date associated with a particular stage of the disease. It may further be beneficial to extract other dates, such as a date of a later advanced diagnosis (e.g., due to a recurrence or advanced stage of a disease). This may allow researchers to make determinations across large populations of patients in order to, for example, select patients for inclusion in a clinical trial.

Patient information may be included in electronic medical records (EMRs). However, in many cases, information regarding diagnosis dates or other key events is represented in unstructured data (e.g., doctors' visit notes, lab technician reports, or other text-based data), which can make computer-based extraction of relevant date information difficult. For example, a doctor may include notes referring to a medical diagnosis in several documents within a patient's medical record without explicitly including a date of diagnosis. Accordingly, determining a precise date of a diagnosis (or similar event) based on ambiguous notes may involve piecing together several snippets of information. Further, the sheer volume of data that a researcher would have to review makes manual extraction of dates or other information infeasible. For example, this may include searching though thousands, tens of thousands, hundreds of thousands, or millions of patient medical records, each which may include hundreds of pages of unstructured text. Accordingly, it can be very time consuming and arduous, if not impossible, for human reviewers to process this amount of data. Therefore, using conventional techniques, extracting key dates from patient medical records, especially for large groups of patients, may quickly become an unsurmountable task.

Accordingly, in view of these and other deficiencies in current techniques, technical solutions are needed to more accurately extract key dates associated with diagnosis and treatment of patients. In particular, solutions should advantageously allow particular dates (e.g., dates of initial diagnosis, dates of advanced diagnoses, start date of treatment, end date of treatment, dates tested for a particular condition, etc.) to be extracted from unstructured data in large sets of patient EMRs.

SUMMARY

Embodiments consistent with the present disclosure include systems and methods for processing data to extract a patient event date. In an embodiment, a model-assisted system may comprise a least one processor. The processor may be programmed to access a database storing a medical record associated with a patient, the medical record comprising unstructured data; analyze the unstructured data to identify a plurality of dates represented in at least one document included in the medical record; identify a plurality of snippets of information included in the at least one document, each snippet of the plurality of snippets being associated with a date of the plurality of dates; input the plurality of snippets into a machine learning model, the machine learning model having been trained to determine associations between dates and patient events based on a training set of snippet data; and determine whether each date of the plurality of dates is associated with a patient event based on an output of the machine learning model.

In an embodiment, a method for processing data to extract a patient event date is disclosed. The method may include accessing a database storing a medical record associated with a patient, the medical record comprising unstructured data; analyzing the unstructured data to identify a plurality of dates represented in at least one document included in the medical record; identifying a plurality of snippets of information included in the at least one document, each snippet of the plurality of snippets being associated with a date of the plurality of dates; inputting the plurality of snippets into a machine learning model, the machine learning model having been trained to determine associations between dates and patient events based on a training set of snippet data; and determining whether each date of the plurality of dates is associated with a patient event based on an output of the machine learning model.

Consistent with other disclosed embodiments, non-transitory computer readable storage media may store program instructions, which are executed by at least one processor and perform any of the methods described herein.

BRIEF DESCRIPTION OF THE DRAWINGS

The accompanying drawings, which are incorporated in and constitute part of this specification, and together with the description, illustrate and serve to explain the principles of various exemplary embodiments. In the drawings:

FIGS. 4A, 4B, 4C, 4D, 4E, and 4F are diagrams illustrating exemplary user interfaces for providing information of a patient and suggested trials, consistent with the present disclosure.

FIG. 5 is a diagram illustrating an exemplary user interface for surfacing patient records, consistent with the present disclosure.

FIGS. 6A, 6B, and 6C are diagrams illustrating exemplary user interfaces for providing feasibility analysis.

DETAILED DESCRIPTION

Figure 1:
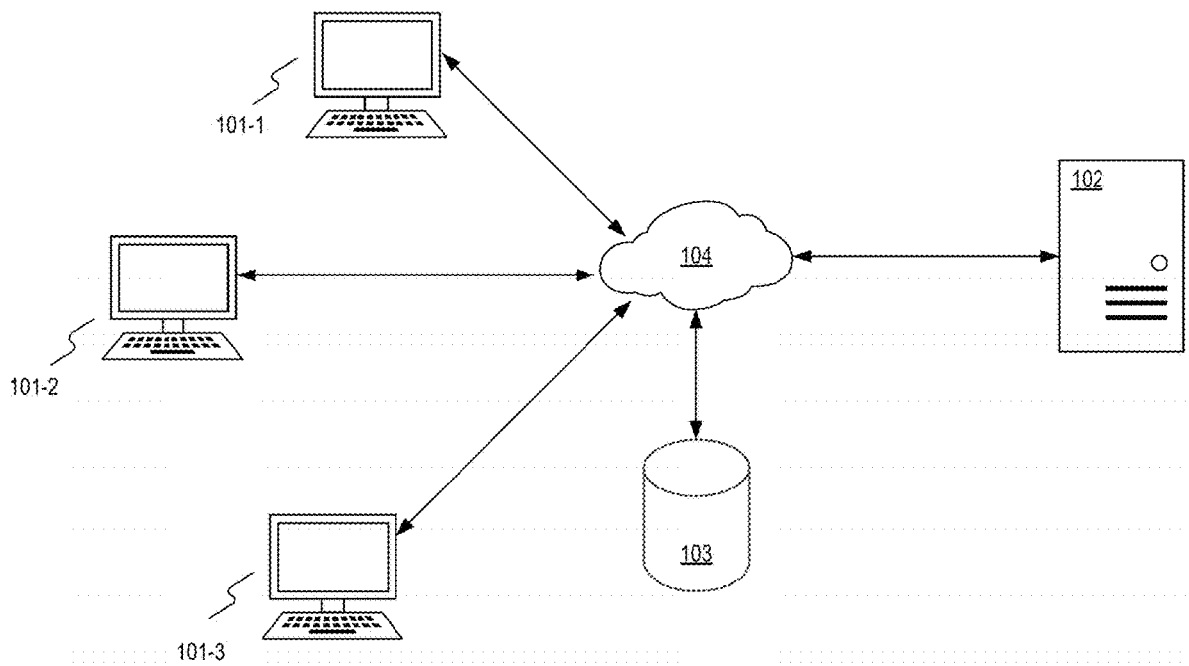
FIG. 1 is a block diagram illustrating an exemplary system for providing one or more suggested patients for a trial or one or more suggested trials for a patient, consistent with the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, repeating, or adding steps to the disclosed methods. Moreover, any of the steps in the illustrative methods may be performed consecutively or simultaneously. Accordingly, the following detailed description is not limited to the disclosed embodiments and examples. Instead, the proper scope is defined by the appended claims.

Embodiments herein include computer-implemented methods, tangible non-transitory computer-readable mediums, and systems. The computer-implemented methods may be executed, for example, by at least one processor (e.g., a processing device) that receives instructions from a non-transitory computer-readable storage medium. Similarly, systems consistent with the present disclosure may include at least one processor (e.g., a processing device) and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

In this disclosure, a system for selecting one or more patients for a trial and/or selecting one or more trials for a patient, based on a genomic testing status, is disclosed.

FIG. 1 illustrates an exemplary system 100 for implementing embodiments consistent with the present disclosure, described in detail below. As shown in FIG. 1, system 100 may include one or more client devices 101, a computing device 102, a database 103, and a network 104. It will be appreciated from this disclosure that the number and arrangement of these components are exemplary and provided for purposes of illustration. Other arrangements and numbers of components may be used without departing from the teachings and embodiments of the present disclosure.

A client device 101 (e.g., client device 101-1, 101-2, 101-3) may be configured to receive user input from a user for creating a new trial and/or to perform any step of any process discussed herein. For example, client device 101 may reside at a clinic, and a user (e.g., a physician or administrator) may enter information for creating a new trial portfolio at an input device (such as an input device 153) of client device 101. A trial portfolio may include a group of trials, a group of trials meeting certain criteria, patient information for a group of patients for a trial, or any other information relating to creating or managing a trial. Client device 101 may include a processor, memory, input device, output device, or other computing component. For example, client device 101 may have components corresponding to those of computing device 102. By way of example, the user may enter an identification number (e.g., a National Clinical Trial (NCT) number or ClinicalTrials.gov identifier) at an interface of client device 101 for creating a new trial, and client device 101 may transmit the identification number to computing device 102. Computing device 102 may create a trial portfolio for the new trial based on the identification number. Client device 101 may also receive and present information received from computing device 102. For example, client device 101 may receive information relating to suggested patients for one or more trials from computing device 102 and present the information at an interface of client device 101 to the user. In some embodiments, client devices 101-1, 101-2, and 101-2 may reside at the same site or different sites.

Computing device 102 may be configured to receive information from client device 101 for creating the new trial portfolio from client device 101. Computing device 102 may also create a trial portfolio based on the information received from computing device 102. The trial information received by computing device 102 may include at least a portion of trial eligibility criteria associated with the trial, such as a genomic testing eligibility restriction. Computing device 102 may also create a new trial portfolio for the trial based on the trial information. The trial portfolio may include one or more trial eligibility criteria for determining whether a patient is eligible for the trial. For example, trial eligibility criteria may include a genomic testing restriction that an eligible patient must have a verified genomic testing status. Computing device 102 may further automatically generate an algorithm for suggesting one or more eligible patients for the new trial based on the trial eligibility criteria (sometimes referred to herein as an "patient-trial matching algorithm"). For example, computing device 102 may automatically generate an algorithm representing an expression tree based on the trial eligibility criteria, and the nodes and/or leaves of the expression tree may represent the trial eligibility criteria. In some embodiments, a strength of eligibility may be determined, which may be based on a degree to which a patient matches a set of criteria. For example, a patient matching 90% of a set of criteria may have a higher strength of eligibility than a patient matching 50% of a set of criteria. As another example, a patient with a verified genomic testing status including an indicator of "tested" may have a higher strength of eligibility for a trial having an eligibility restriction of "tested" than a patient who only has a predicted genomic testing status having an indicator of "tested" (or even another indicator) that has not been verified. In some embodiments, a strength of eligibility may be stored and/or transmitted by a client device 101, a computing device 102, and/or any other device suitable for managing patient data. In some embodiments, a strength of eligibility may be determined for criteria that are designated as preferred but not for criteria designated as absolute restrictions on eligibility (e.g., designations which may be input at a client device 101 and/or computing device 102).

Computing device 102 may also be configured to obtain electronic medical records associated with a plurality of patients and determine whether one or more patients may be eligible for a trial based on a patient-trial matching algorithm and electronic medical records. For example, computing device 102 may obtain electronic medical records associated with the patients of one or more clinics (e.g., a clinic associated with client device 101). Electronic medical records (EMRs) may include a variety of patient information, such as a patient name, a patient age, a patient gender, a medical identification number, a physician name, a care center name, a visit date, a visit result, a test, a test result, a biomarker indicator, a diagnosis, a prognosis, a medication, a dosage, a disease, a medical condition, and/or any other information relevant to patient health. Such information may be stored and/or received as a combination of structured and/or unstructured information. For example, structured information generally refers to information organized into a predetermined data structure, such as a combination of data fields. Unstructured information, on the other hand, generally refers to information that is not in a particular structure, and thus may not exist in a language immediately readable by a machine (e.g., handwritten text to which optical character recognition may be applied to help convert the text to machine-readable data). In some embodiments, client device 101 and/or computing device 102 may be configured to parse unstructured information to generate structured information for a predetermined data structure, which may be user-configurable. In further embodiments, client device 101 and/or computing device 102 may be configured to parse unstructured information to make predictions about the likelihood of certain events (e.g., the occurrence of genomic testing).

Additionally, client device 101 and/or computing device 102 may be configured to receive and/or process input information for a computerized model (e.g., a patient-trial matching model, neural network model based on neural network 300A). For example, client device 101 may include or may be connected to a scanning device, which may scan documents (e.g., documents containing unstructured data) associated with a patient. For example, a scanning device (e.g., a portable document scanner) may scan a handwritten note from a doctor and convert it to an image or other data entity (e.g., structured data). Computing device 102 may determine one or more patients among the patients of the clinic who may be eligible for a trial based on a patient-trial matching algorithm and electronic medical records (e.g., records that include structured and/or or unstructured data) and associated patient documents either included in the electronic medical records or otherwise associated with a patient.

By way of example, computing device 102 may create a namedtuple that has a combination of numbers and/or letters for each of the patients based on the electronic medical records (e.g., age, disease, biomarkers). Computing device 102 may evaluate the created namedtuples associated with the patients against the expression tree, which may return a number indicating the eligibility for each of the patients. For example, the expression-tree algorithm may output "0" for ineligible or "1" for eligible. Alternatively, the algorithm may output a probability value (e.g., a non-whole number) indicating the eligibility for each of the patients. Using the output of the expression-tree algorithm, patients may be matched to trials. For example, computing device 102 may determine the patients receiving an output of "1", or of a value within a predetermined distance of "1", and may transmit patient information associated with those patients to a client device 101 (e.g., to cause client device 101 to display information related to those patients, such as a biomarker).

Computing device 102 may further be configured to output one or more suggested eligible patients for the new trial. For example, computing device 102 may output one or more suggested patients to an output device (e.g., a display, printer). Alternatively or additionally, computing device 102 may transmit instructions for displaying information representing the one or more suggested patients to client device 101, which may present the information to the user.

In some embodiments, computing device 102 may be configured to provide one or more suggested trials for a patient. For example, the user may select a patient via the input device of client device 101 (or computing device 102), and computing device 102 may provide one or more trials for which the patient may be eligible based on one or more patient-trial matching algorithms and the electronic medical record associated with the patient.

In some embodiments, client device 101 and computing device 102 may be integrated into one device configured to perform the functions of client device 101 and computing device 102 disclosed herein. For example, a user may input information for creating a new trial via input device 153 of computing device 102, which may display one or more suggested patients for the new trial via an output device (e.g., output device 154, discussed below).

Database 103 may be configured to store information and data for one or more components of system 100. For example, database 103 may store electronic medical records associated with one or more patients. Database 103 may also store information relating to one or more trials. For example, database 103 may store trial eligibility criteria associated with each of the trials, such as a genomic testing criterion. In some embodiments, database 103 may also store patient-trial matching algorithms for determining one or more suggested eligible patients for a trial, and/or one or more suggested eligible trials for a patient. Client device 101 and/or computing device 102 may be configured to access and obtain the data stored on database 103 via network 104. In some embodiments, database 103 may be operated by a third party. For example, computing device 102 may request information relating to a particular trial from database 103, which may transmit the requested information to computing device 102. By way of example, computing device 102 may request the information of trial by transmitting a trial identifier (e.g., an NCT number) to database 103, which may transmit the requested information (e.g., trial eligibility criteria) to computing device 102.

Network 104 may be configured to facilitate communications among the components of system 100. Network 104 may include a local area network (LAN), a wide area network (WAN), portions of the Internet, an Intranet, a cellular network, a short-ranged network (e.g., a Bluetooth™ based network), or the like, or a combination thereof.

Figure 2:
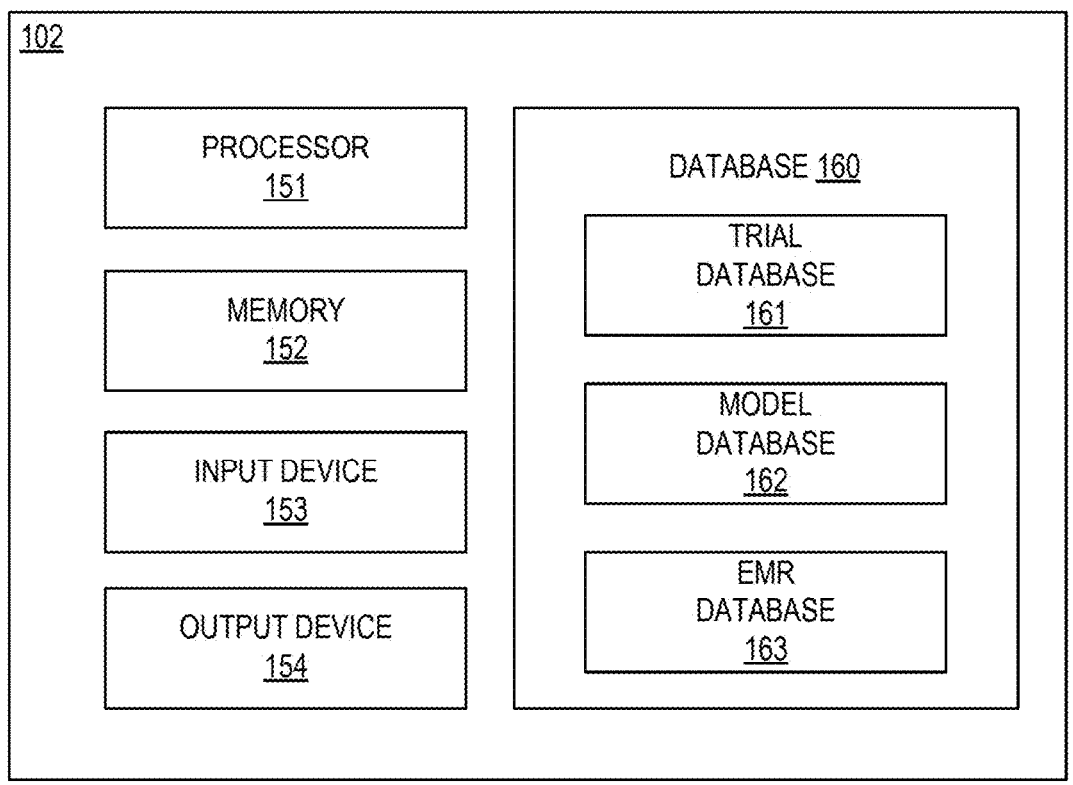
FIG. 2 is a block diagram illustrating an exemplary computing device for providing one or more suggested patients for a trial or one or more suggested trials for a patient, consistent with the present disclosure.

FIG. 2 is a block diagram illustrating an exemplary computing device 102. Computing device 102 may include at least one processor (e.g., processor 151), a memory 152, an input device 153, an output device 154, and a database 160.

Processor 151 may be configured to perform one or more functions described in this application. As mentioned, computing device 102 may include memory 152 that may store instructions for various components of computing device 102. For example, memory 152 may store instructions that, when executed by processor 151, may be configured to cause processor 151 to perform one or more functions described herein.

Input device 153 may be configured to receive input from the user of computing device 102, and one or more components of computing device 102 may perform one or more functions in response to the input received. In some embodiments, input device 153 may include a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, a transceiver, an input device, an output device, or other input device to perform methods of the disclosed embodiments. For example, input device 153 may include an interface displayed on a touchscreen (e.g., output device 154). Output device 154 may be configured to output information and/or data to the user. For example, output device 154 may include a display configured to display one or more suggested patients for a trial (e.g., a light-emitting diode (LED) display, a liquid crystal display (LCD) display, etc.). In some embodiments, output device 154 may include a touchscreen.

Database 160 may be configured to store various data and information for one or more components of computing device 102. For example, database 160 may include a trial database 161, a model database 162, and an electronic medical record (EMR) database 163. Trial database 161 may be configured to store information relating to one or more trials. For example, trial database 161 may store a trial portfolio for each of the trials, which may include trial eligibility criteria of a trial. Trial eligibility criteria of a trial may include a trial status, a trial disease, a trial line of therapy, an eligibility age, a trial biomarker criterion, a predicted genomic testing criterion, a verified genomic testing criterion, or the like, or a combination thereof. Of course, a criterion may include a presence of a particular attribute (e.g., having a particular genomic testing status), or may include an absence of a particular attribute (e.g., not having a particular genomic testing status). In some embodiments, a trial portfolio may also include trial name, trial description, or the like, or a combination thereof. Trial database 161 may further store an edit history including changes made to a trial. Computing device 102 may obtain information relating to the trials from trial database 161 and modify the information if needed. For example, computing device 102 may create a trial portfolio for a new trial and store the trial portfolio into trial database 161.

Model database 162 may store patient-trial matching models or algorithms. A patient-trial matching algorithm refers to an algorithm for determining one or more eligible patients for a trial and/or for determining one or more suggested eligible trials for a patient. A patient-trial matching algorithm may include a number of machine-configured and/or user-configured expressions, variables, data mappings, and/or other algorithm parameters, which may create connections between different information, such as patient data and user-selected trial parameters. Algorithm parameters may be updated based on subsequent datasets of patient information, to provide desirable outputs. Computing device 102 may obtain algorithms from model database 162. In some embodiments, computing device 102 may create an algorithm for a new trial and store the created algorithm into model database 162. A patient-trial matching model may be a computerized model, such as a machine learning model, a data model, a statistical model, a recurrent neural network (RNN) model, a long-short term memory (LSTM) model, and/or a neural network model (e.g., implementing neural network 300A), consistent with the disclosed embodiments. A patient-trial matching model may be trained or untrained, and may be supervised or unsupervised. EMR database 163 may store electronic medical records associated with patients. Processor 151 may receive one or more electronic medical records from EMR database 163.

Figure 3A:
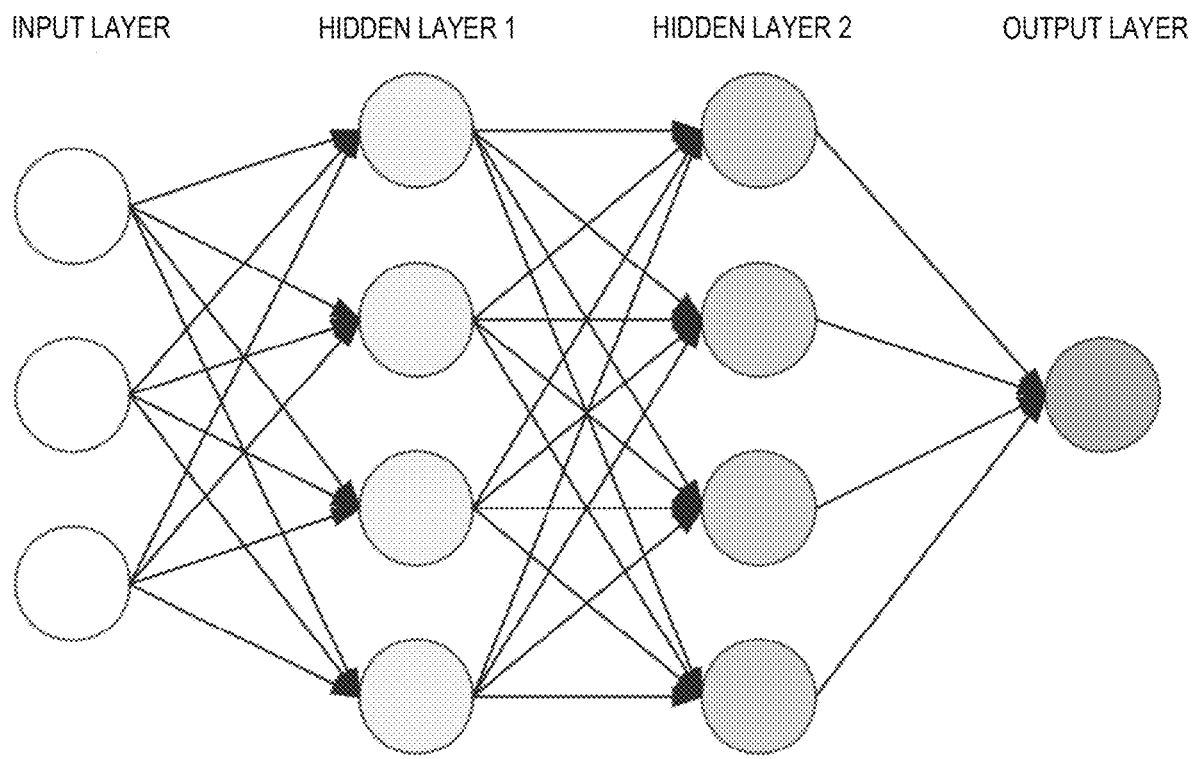
FIG. 3A is a diagram illustrating an exemplary neural network for providing patient information, consistent with the present disclosure.

FIG. 3A illustrates an exemplary neural network 300A. Neural network 300A may include an input layer, one or more hidden layers, and an output layer. Each of the layers may include one or more nodes. In some embodiments, the output layer may include one node. Alternatively, the output layer may include a plurality of nodes, and each of the nodes may output data. The input layer may be configured to receive input (e.g., an electronic medical record associated with a patient). In some embodiments, every node in one layer is connected to every other node in the next layer. A node may take the weighted sum of its inputs and pass the weighted sum through a non-linear activation function, the results of which may be output as the input of another node in the next layer. The data may flow from left to right, and the final output may be calculated at the output layer based on the calculation of all the nodes. Neural network 300A may output a probability indicating eligibility of the patient for the trial, which may be based on information from a received input. A neural network, such as neural network 300A, may be used to predict a genomic testing status of a patient. For example, some nodes of neural network 300A may be associated with information determined from patient information (e.g., structured and/or unstructured information), user inputs (e.g., user-defined parameters for the neural network), verified genomic testing statuses, previous neural network outputs, and/or any other data for informing configuration of neural network 300A.

In some embodiments, computing device 102 may determine a patient-trial match between a plurality of patients and a plurality of trials, based on the patient-trial matching algorithms associated with the trials and electronic medical records of the patients. For example, computing device 102 may determine one or more suggested eligible patients for each of the trials and/or one or more suggested eligible trials for each of the patients. Computing device 102 may also generate a data structure representing the relationship between the patients and trials and store the data structure in a database (e.g., database 103, database 160). Computing device 102 may further present the data representing the relationship between the patients and trials to the user. For example, computing device 102 may be configured to generate a patient-trial matching report. By way of example, computing device 102 may receive user input for defining filters for the data to appear on the report, including, for example, patient information (e.g., gender, age, location, patient schedule, diagnosis, biomarker, predicted genomic testing status, verified genomic testing status, or the like, or a combination thereof), treatment information (e.g., treatment, inclusionary and/or exclusion drug), and trial information (trial name, study drug, sponsor, study type, trial description, diagnosis, biomarker criteria, line of therapy, or the like, or a combination thereof). Computing device 102 may compile the patients and/or trials that match the filtered data into a report.

Figure 3B:
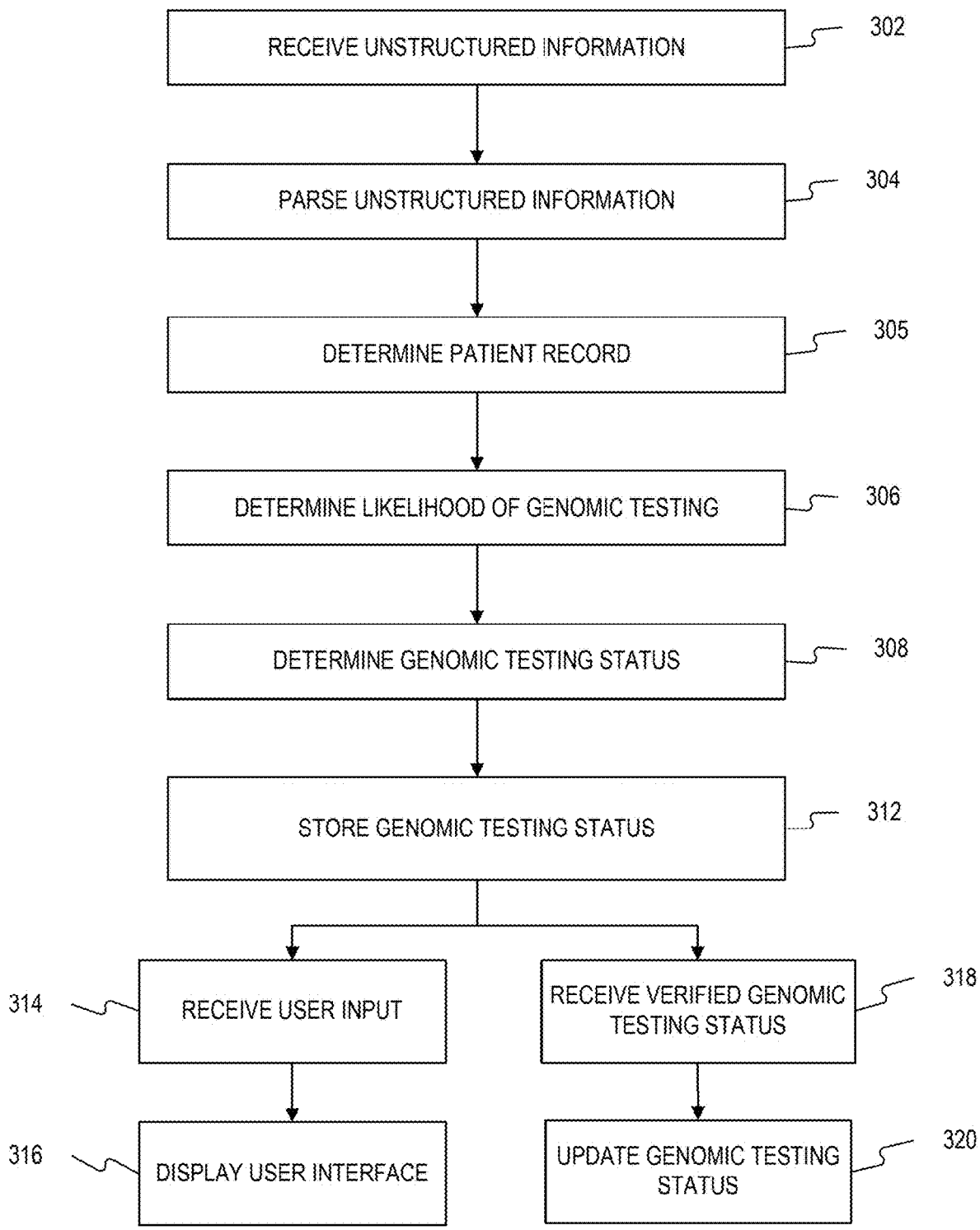
FIG. 3B is a flowchart illustrating an exemplary process for determining a genomic testing status.

FIG. 3B is a flowchart illustrating an exemplary process 300B for predicting the likelihood of an occurrence of genomic testing for a patient and determining a patient's genomic testing status based on the predicted likelihood, consistent with the present disclosure. While process 300B is described in connection with client device 101, one skilled in the art would understand that one or more steps of process 300B may be performed by other components of the system (e.g., computing device 102 or processor 151). Alternatively or additionally, some steps of process 300 may be performed by multiple client devices 101, multiple computing devices 102, or any combination of devices. One of skill will understand that the steps illustrated in FIG. 3B are exemplary and steps may be added, merged, divided, duplicated, repeated, modified, performed sequentially, performed in parallel, and/or deleted in some embodiments.

At step 302, client device 101 may receive unstructured information associated with a patient (or multiple patients) from a source (or multiple sources). In some embodiments, a source may be remote from client device 101, or may be client device 101 itself. In some embodiments, unstructured information may be included in one or more patient records such as a scanned document, an unstructured field included or otherwise associated with an EMR (e.g., a handwritten or electronic note), and/or other representation of patient information. In some embodiments, unstructured information may include medical data associated with the patient (e.g., a genomic testing status, a test result, a patient age, a type of disease, a disease stage, etc.).

At step 304, client device 101 may parse unstructured information (e.g., unstructured information in a patient record). In some embodiments, parsing unstructured information may include identifying patterns or information contained in a record (e.g., identifying an occurrence of genomic testing for a patient, identifying a patient name, a physician name, a lab name, a test date, an admittance date, a line of therapy, a drug, etc.). In further embodiments, parsing unstructured information may include converting all or a portion of a record to a structured format. By way of example, a record may be an electronic record having structured and/or unstructured information (e.g., a Portable Document Format (PDF) record, an Extensible Markup Language (XML) file, etc.), an image, a chart, a drawing, or any other source of medical information. In some embodiments, an electronic record may be generated by a scanning device (e.g., a portable document scanner, a multi-functional printer, etc.), which may be connected to network 104. In some embodiments, the plurality of patient records may include at least one electronic record generated by scanning a physical document with a scanning device. For example, a scanning device may scan a physical document and generate an electronic record, which may include unstructured information from the physical document.

In some embodiments, parsing unstructured information may include identifying patterns and/or other information associated with genomic testing information and/or extracting genomic testing information, which may be used to categorize and/or prioritize patient records (e.g., step 305), predict a likelihood of an occurrence of genomic testing (e.g., step 306), and/or a genomic testing status (e.g., step 308). In some embodiments, identified genomic testing patterns or information and/or extracted genomic testing information may be associated with a patient identifier (e.g., linked to an electronic record of a patient identified in a document). In some embodiments, a trained model (e.g., implemented by a computing device 102) may parse unstructured information. A trained model may be, without limitation, any one of a computer software module, an algorithm, a machine learning model, a data model, a statistical model, a recurrent neural network (RNN) model, a long-short term memory (LSTM) model, or another neural network model (e.g., neural network 300A), consistent with the disclosed embodiments. A trained model may be implemented at computing device 102 or another computing device connected to network 104. In some embodiments, at least two trained models may be used. For example, one trained model to categorize and/or prioritize patient records (step 305) and a second trained model to predict an occurrence of genomic testing for a patient (step 306).

In further embodiments, genomic testing information may be identified from structured information (e.g., structured information that is part of a patient dataset). In some embodiments, when genomic testing information is included in structured information, the step of predicting the likelihood of genomic testing may be omitted. In some embodiments, structured information may be associated with unstructured information. For example, structured information and unstructured information may be associated with the same patient (e.g., part of a same EMR) and structured information may also be received at step 302).

In some embodiments (e.g., as part of step 305), client device 101 may categorize a plurality of patient records into record categories, which may be associated with different degrees of reliability. Client device 101 may also determine a priority order of the plurality of patient records (e.g., based on the record categories), which may be used in a subsequent step (e.g., step 306). By way of example, determining the priority order may include ordering the plurality of patient records based on dates associated with the plurality of patient records (e.g., placing records with a more recent date higher in the priority order). As yet another example, priority order may include ordering the plurality of patient records based on predefined record categories (e.g., a lab record category, a pathology record category, a genetic counseling record category, a healthcare provider notes category, a textual content category, etc.).

At step 305, client device 101 may determine a patient record from among a plurality of patient records. In some embodiments, a determined patient record may be considered a primary patient record, which may indicate that it has a relatively higher influence on a prediction, or is otherwise notable for a user. In some embodiments, client device 101 may determine a primary patient record using a first machine learning model. In some embodiments, at least a portion of information represented in a primary patient record may correlate (e.g., determined by a machine learning model) to genomic testing information. For example, a first machine learning model may be configured to associate record attributes, such as particular words, combinations of words, word frequencies, record formats, record sources (e.g., a lab), other record attribute, or combination thereof, with an occurrence of genomic testing. In some embodiments, a client device 101 may determine that a record (e.g., primary patient record) is from a particular record category and may determine that the record is a primary patient record (e.g., using a first machine-learning model) based on the determination that the primary patient record is from the particular record category.

In some embodiments, a client device 101 (e.g., using a processor) may determine the primary patient record based on a comparison of the correlation to a threshold. For example, a client device 101 may determine that the record has a correlation with a sufficient combination (e.g., according to model weights or other factors) of record attributes correlated with the occurrence of genomic testing. In some embodiments, client device 101 may receive the threshold from an entity associated with the client device (e.g., a client device configured to display a user interface). For example, a particular threshold may be associated with (e.g., set by) a particular research entity, clinic, etc. In some embodiments, a patient record (e.g., primary patient record) may be linked to a determination (e.g., a prediction of a likelihood of whether a patient has undergone genomic testing). In some embodiments, a primary patient record may be determined after a determination of a likelihood that a patient has had genomic testing (e.g., at step 306 or after step 308). In still yet further embodiments, step 305 may include identifying a plurality of patient records.

At step 306, client device 101 may determine a likelihood that a patient has had genomic testing (e.g., likelihood of an occurrence of genomic testing) to determine a patient testing status (e.g., "tested," "untested," "not enough information," and/or any information associated with a degree of testing for a patient). In some embodiments, client device 101 may determine the likelihood that a patient has had genomic testing using a second machine learning model and/or based on at least one of the patient records. For example, a second machine learning model may use structured and/or unstructured information parsed from at least one patient record to predict a likelihood of an occurrence of genomic testing for a patient (e.g., a likelihood that a patient has been tested for a genomic biomarker). A machine learning model may have been trained using combinations of patient records, genomic testing statuses, and user inputs. In some embodiments, client device 101 may determine the likelihood of a genomic testing occurrence of a patient according to a priority order of the plurality of patient records (e.g., determined at step 305). A likelihood that a patient has had genomic testing may be represented as a combination of a percentage and a genomic testing status (e.g., 80% chance of "tested" status, 10% chance of "untested" status, 10% chance of "not enough information" status, etc.). In some embodiments, a likelihood that a patient has had genomic testing may be represented as multiple such combinations. In other embodiments, a likelihood that a patient has had genomic testing may be represented as a number (e.g., a percentage). In some embodiments, a client device 101 may determine a likelihood that a patient has had genomic testing periodically. For example, client device 101 may determine a likelihood of a genomic testing of a patient periodically using at least one of: a time period measured in hours, a time period measured in days, or a time period determined based on a frequency of receiving new patient records. In some embodiments, client device 101 may update a likelihood of a genomic testing of a patient after receiving additional patient records.

For example, after receiving a new record of a particular type (e.g., a lab report), a threshold number of records (e.g., two records related to a patient) and/or after a threshold number of patient visits to a clinic (e.g., determined from a medical record, user input, etc.), client device 101 may be triggered to update a patient's likelihood of genomic testing.

At step 308, client device 101 may determine a genomic testing status of a patient based on a determined likelihood of an occurrence of genomic testing for a patient (e.g., determined at step 306). A genomic testing status may include "likely," "unlikely," "possibly," "not enough information," and/or any other information indicating a likelihood that a patient has had genomic testing. For example, client device 101 may determine a particular genomic testing status if that status had an associated likelihood reaching a threshold (e.g., 85% chance of having one status, 10% chance of having another status). In some embodiments, a genomic testing status may cause a change to a displayed user interface (e.g., such that a user interface may be dynamic, even after being displayed). For example, additional patient information may be displayed within a feasibility analysis based on a genomic testing status.

At step 312, client device 101 may store a genomic testing status (e.g., determined at step 308). For example, client device 101 may store a genomic testing status of a patient at database 103, memory 152, database 160, and/or any other storage medium. In some embodiments, client device 101 may associate an indicator of the genomic testing status of a patient with a patient identifier of the patient, and may store the association among a plurality of other associations (e.g., associations for other patients) in a database (e.g., database 103). For example, client device 101 may associate a genomic testing status with a particular patient, such as through a data binding, and may store the data binding together with the genomic testing status. In some embodiments, such as after performing step 312, process 300B may proceed to step 314, which relates to a user input. Additionally or alternatively, process 300B may proceed to step 318, which relates to a verified genomic testing status. As all steps in process 300B are optional, re-arrangeable, repeatable, and capable of simultaneous performance, in some embodiments, for example, process 300B may include steps 314 and 316, but not steps 318 or 320. Of course, the opposite is also true, as well as the fact that in some embodiments, process 300B may include all of steps 314-320.

In some embodiments, process 300B may include step 314, at which client device 101 may receive a user input, which may be a request to display particular information. For example, client device 101 may receive a user input (e.g., an input to a user interface displayed at output device 154) to display patient information, such as a genomic testing status and/or at least one document used to determine the likelihood of genomic testing for a patient. In some embodiments, client device 101 may receive a user input at one of the user interfaces described with respect to FIGS. 4A-6C. By way of example, computing device 102 may receive a search request (e.g., for feasibility analysis) from a remote device (e.g., a client device 101). The search request may include at least one parameter associated with a genomic testing status of a patient (e.g., a parameter requesting patient information associated with genomic testing statuses of "verified tested," "tested," "likely tested," etc.). In some embodiments, computing device 102 may access testing criteria for a patient, which may be done in response to a user input. Such testing criteria may include a testing practice, a timeline, a regulatory criterion, etc., which may be used to generate a notification or other information (e.g., at step 316).

At step 316, client device 101 may display a user interface, which client device 101 may determine based on user input received at step 314. Client device 101 may be configured to display a user interface at an output device 154 using data stored at memory 152. In some embodiments, client device 101 may display a user interface described with respect to any of FIGS. 4A-6C. In some embodiments, client device 101 may retrieve an indicator of a genomic testing status of a patient and/or a patient identifier in response to a search request received from a remote device. In some embodiments, client device 101 may display a user interface comprising an indicator of a genomic testing status of a patient and a link to a primary patient record, which may be correlated with the genomic testing status of the indicator. In some embodiments, computing device 102 may transmit a notification to a remote device, which may be based on at least one testing criterion (e.g., received at step 314) and/or the genomic testing status of the patient (e.g., "not tested"). By way of example, computing device 102 may determine that a patient genomic testing status does not satisfy at least one testing criterion (e.g., timeline) and may transmit a notification to, for example, a client device 101, to alert a physician or other user.

In some embodiments, the user interface may include an indicator of a biomarker associated with the patient (e.g., a biomarker for which the patient has been tested, a biomarker test result, etc.). In some embodiments, client device 101 determine the biomarker based on a user input received via the user interface (e.g., at an interactable element 406B, 406E, etc.). In some embodiments, client device 101 may determine the biomarker using a third machine learning model. For example, a third machine learning model may interpret information from a patient record to predict a biomarker associated with a patient. To further this example, in some embodiments, the third machine learning model may interpret records associated with genomic testing to determine biomarker information, which the third machine learning model may use to predict a biomarker associated with a patient. In some embodiments, a notification may be transmitted to an application at a remote device that is configured to display a user interface (e.g., a user interface discussed with respect to FIGS. 4A-6C) and a primary patient record.

In some embodiments, process 300B may include step 318, at which client device 101 may receive an input comprising a verified genomic testing status of the patient. For example, a client device 101 may receive an input that a patient has a verified status of "tested" or "not tested," which may be indicated by a user input (e.g., a selection of a selector 404D), or otherwise indicated in a structured field. Such an input may prevent a machine learning model (e.g., a machine learning model for predicting a likelihood of a genomic testing status) from running, which may reduce strain on computing resources. For example, in some embodiments, a machine learning model may be configured to only predict genomic testing status likelihoods for patients having a predicted likelihood of a genomic status, no predicted likelihood of a genomic status, or a verified status of "not tested." Step 318, as with any step in process 300B or any other process herein, may occur concurrently with other steps. For example, a client device 101 (or other device) may receive a verified genomic testing status while also receiving a user input.

At step 320, client device 101 may update a genomic testing status of a patient, which may be based on a verified genomic testing status. In some embodiments, client device may transmit the verified genomic testing status to a remote device (e.g., database 103). In some embodiments, client device 101 may change at least one parameter of the first machine learning model based on the verified genomic testing status of the patient. For example, the verified genomic testing status of the patient and at least one patient record associated with the patient may be used to train a machine learning model to predict a likelihood of a genomic testing status. As yet another example, client device 101 may add, remove, and/or modify a node and/or layer of a neural network In some embodiments, a verified genomic testing status may cause a change to a displayed user interface (e.g., such that a user interface may be dynamic, even after being displayed). For example, additional patient information may be displayed within a feasibility analysis based on a verified genomic testing status.

FIGS. 4A-4F, 5, and 6A-6C illustrate exemplary user interfaces for managing patient genomic testing information, consistent with the present disclosure. Any of the exemplary user interfaces described herein may be displayed via output device 154 of computing device 102 (e.g., a display or touchscreen), and the user may enter information via input device 153. Alternatively or additionally, computing device 102 may transmit instructions to client device 101 for displaying a user interface via an output device of client device 101 (e.g., a display or touchscreen) and for receiving user input via an input device of client device 101. As described below, user interfaces may include a region, indicator, link, and/or other graphical element (interactable or non-interactable). Any or all of the graphical elements discussed below, with respect to any of the user interfaces, may be re-arranged, duplicated, added, and/or removed. Using user interface 400A in FIG. 4A as an example, region 404 may be placed above region 406, which in turn may appear above region 402. As another example, in FIG. 4A, additional displayed elements may be ordered differently in the graphical element (e.g., the elements may be ordered in the graphical element in the following order: region 404, link 404C, region 406, and region 402).

Exemplary FIG. 4A illustrates a user interface 400A which may display graphical (e.g., interactable) elements, which may show information about a patient, including a predicted likelihood of an occurrence of genomic testing. User interface 400A may include a region 402, which may include information about at least one biomarker associated with a patient (e.g., a biomarker type, a biomarker result, a lab identification, etc.).

User interface 400A may also include a region 404, which may include information about a genomic testing status of a patient, which may include an inferred genomic testing status (e.g., based on a predicted likelihood). For example, region 404 may include an indicator 404A, which may indicate an inferred likelihood of a genomic testing status (e.g., "likely"). Region 404 may also include an indicator 404B, which may display a date when the likelihood of a genomic testing occurrence was determined, updated, or otherwise influenced (e.g., by a received record, user input, etc.). Region 404 may also include a link 404C, which may link to a record associated with the likelihood. For example, selection of link 404C may cause a record to display within a display that is displaying user interface 400A. Such a record may display in a separate window and/or application, such as is shown with respect to exemplary FIG. 5. Region 404 may also include at least one selector 404D, which may be interactable by a user to confirm/verify a genomic testing status of a patient (e.g., "tested," "not tested"). In some embodiments, selection of a selector 404D may cause another user interface to be displayed (e.g., user interface 400B)

User interface 400A may also include a region 406, which may include graphical elements for managing information related to a biomarker. For example, region 406 may include biomarker information for a particular patient and/or interactable elements, such as link 406A, which, after being selected, may display additional elements, such as interactable elements. For example, link 406A may be selected to allow for biomarker information to be added to a patient record and/or displayed within a user interface.

User interface 400A may also include a region 408, which may include graphical elements related to a drug order history of a patient. Information in region 408 may be sourced from a remote device, such as a user device associated with a physician, a pharmacy, etc. Information in region 408 may also be dynamic, thus allowing for real-time updates to be displayed within user interface 400A or another user interface.

Figure 4B:

Exemplary FIG. 4B illustrates a user interface 400B which may display graphical (e.g., interactable) elements, which may show information about a patient, including a prediction of whether a patient has had genomic testing. User interface 400B may include regions in elements discussed with respect to other figures (e.g., region 402, 404, 406, and/or 408). User interface 400B may also include a link 404F and/or indicators 404E, which may be displayed within region 404. Link 404F may be selectable and may allow a user to change a genomic testing status of a patient (e.g., displayed within a region 404). Indicators 404E may indicate a verified genomic testing status and/or information associated with an update to a genomic testing status (e.g., a user identifier associated with a user who updated the status, a time an update was made, etc.).

Exemplary FIG. 4C illustrates a user interface 400C which may display graphical (e.g., interactable) elements, which may show information about a patient, including a predicted likelihood that genomic testing has occurred for a patient. User interface 400C may include regions discussed with respect to other figures (e.g., region 402, 404, 406, and/or 408). User interface 400C may also include interactable elements 406B, which may be displayed within region 406. Interactable elements 406B may be configured to allow a user to add information to a patient record, which may be related to a biomarker. For example, interactable elements 406B may include a drop-down menu, slider bar, calendar widget, text box, and/or any other graphical user interface element that may allow a user to enter information related to a biomarker. Region 406 may also include link 406C, which may be usable to finalize entry of data into interactable element 406B. For example, after being selected, link 406C may cause a device to verify information in interactable elements 406B as valid (e.g., determining that a vendor indicator input by a user is associated with a vendor that offers a test type also entered by the user, determining that a result date is not a future date, etc.). After being selected, link 406C may cause a device to display another user interface and/or update a patient record (e.g., with updated biomarker information).

Exemplary FIG. 4D illustrates a user interface 400D which may display graphical (e.g., interactable) elements, which may show information about a patient, including a predicted likelihood that genomic testing has occurred for a patient. User interface 400D may include regions in elements discussed with respect to other figures (e.g., region 402, 404, 406, and/or 408). User interface 400D may also include indicators 406D and/or link 406A. Indicators 406D may display information associated with a biomarker captured for a patient (e.g., information which may have at least partially been entered using interactable elements 406B, such as a type of biomarker, a lab entity, a biomarker result, a result date, etc.). Indicators 406D may include interactable elements, which may allow a user to edit associated information. In some embodiments, after being selected, link 406A may cause a user interface 400E, shown in exemplary FIG. 4E, to be displayed. User interface 400E may include interactable elements 406E, which may be displayed within region 406 and may be similar to interactable elements 406B.

Exemplary FIG. 4F illustrates a user interface 400F which may display graphical (e.g., interactable) elements (e.g., including region 402, 404, 406, and/or 408), which may show information related to multiple biomarkers. For example, user interface 400F may include an indicator 406D, which may include information for a first biomarker, and indicator 406F, which may include information for a second biomarker.

Figure 5:
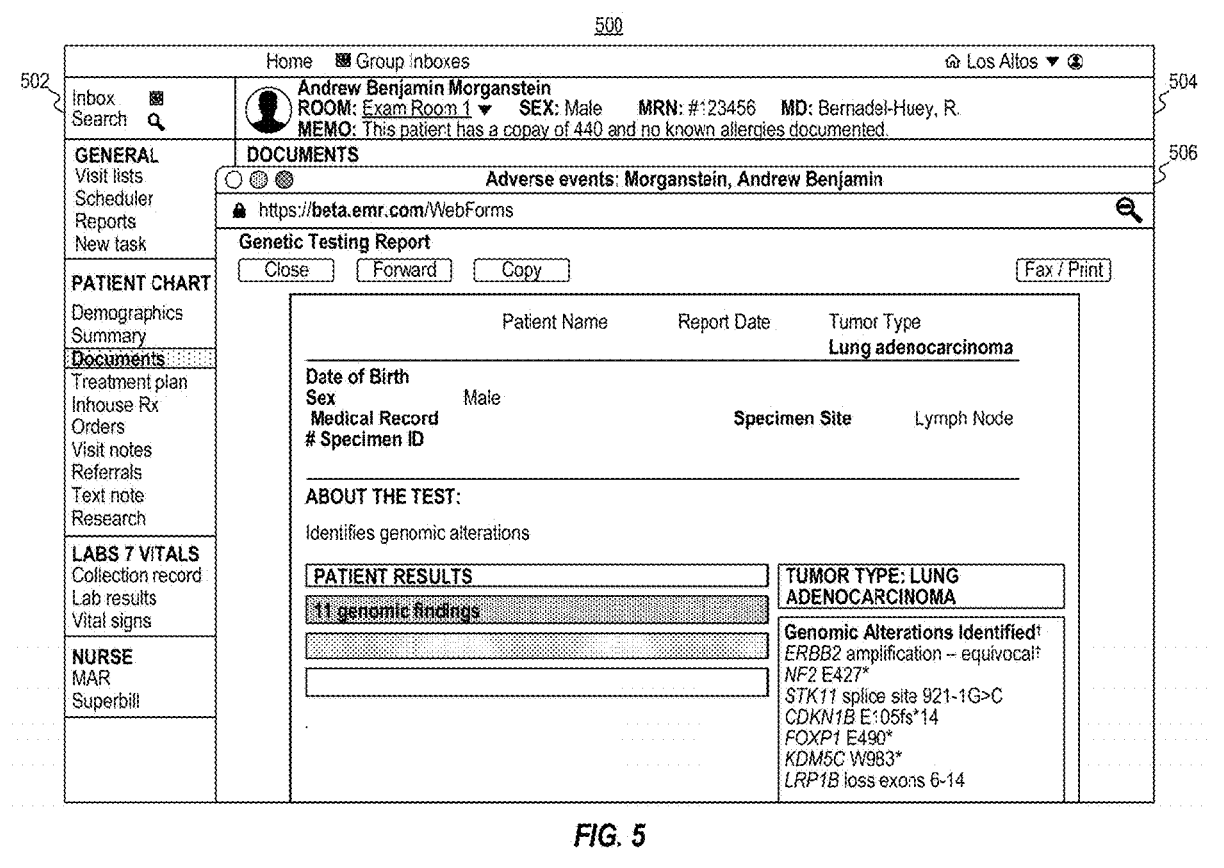

Exemplary FIG. 5 illustrates a user interface 500 for surfacing patient records. User interface 500 may include a sidebar 502, which may include any number of interactable elements for determining a record that may be relevant to a patient (e.g., which may have influenced a prediction of a genomic testing likelihood or status, such as a search bar, text box, button, slide bar, filter, link, etc.). User interface 500 may also include a patient information panel 504, which may include information related to a patient associated with a surfaced patient record (e.g., a patient name, a patient sex, a patient identification number, a patient physician identifier, a patient memo, a patient age, and/or any other patient information). In some embodiments, user interface 500 may include a record display window 506, which may include a record (e.g., a scanned patient document, structured patient information, unstructured patient information, a lab test document, etc.). A record may be sourced from an external source (e.g., a client device 101, database 103, a scanning device, and/or any device associated with a medical service provider).

Exemplary FIG. 6A illustrates a user interface 600A, which may be associated with performing a feasibility analysis. A feasibility analysis may be performed by a computing device 102, for example, to determine a group of patients, which may be based on criteria determined by a user. By enabling determinations of different groups of patients based on different parameters, a device performing a feasibility analysis may be able to provide insight into patient information, which may, for example, allow a user to determine if an adequate group of patients exists, based on patient information, for a particular purpose. For example, user interface 600A may include a feasibility analysis window 602, which may include information for determining patients for a trial. For example, analysis window 602 may include a first criteria region 604, which may include interactable elements that allow a user to input first criteria for a feasibility analysis. First criteria may relate to patient demographics and/or visits, and may include a gender criterion, a location criterion, an age criterion, a patient status criterion (e.g., deceased, living, new patient, old patient), a visit data criterion, etc. Analysis window 602 may also include a second criteria region 606, which may include interactable elements that allow a user to input second criteria for a feasibility analysis. Second criteria may include diagnostic criteria, such as a disease criterion, a testing status (e.g., genomic testing status) criterion, a biomarker criterion, a metastatic status criterion, etc. Analysis window 602 may also include a third criteria region 608, which may include interactable elements that allow a user to input third criteria for a feasibility analysis. Third criteria may include treatment-related criteria, such as a drug type criterion, a medication order data criterion, a drug dosage criterion, etc. Feasibility analysis window may also include a button 610 or other interactable element, which may instruct a device to perform a feasibility analysis using information within user interface 600A.

Exemplary FIG. 6B illustrates a user interface 600B, which may be similar to user interface 600A. For example, user interface 600B may include analysis window 602, which may further include a results region 612, which may include patient information determined by a feasibility analysis. For example, results region 612 may include information associated with patients satisfying a set of criteria. In some embodiments, patient information may be displayed within a table 614 or other graphical structure.

For example, as shown in exemplary FIG. 6C, a user interface 600C may be displayed (e.g., in response to a selection of button 610), which may display information associated with multiple patients. By way of example, patient information may be displayed within table 614, which different rows, such as exemplary rows 614a, 614b, and 614c, being associated with difference patients. A row (or other graphical element displaying patient information) may be removed, added, and/or altered in response to a user input (e.g., a checkbox selection, button selection, etc.).

Figure 7:
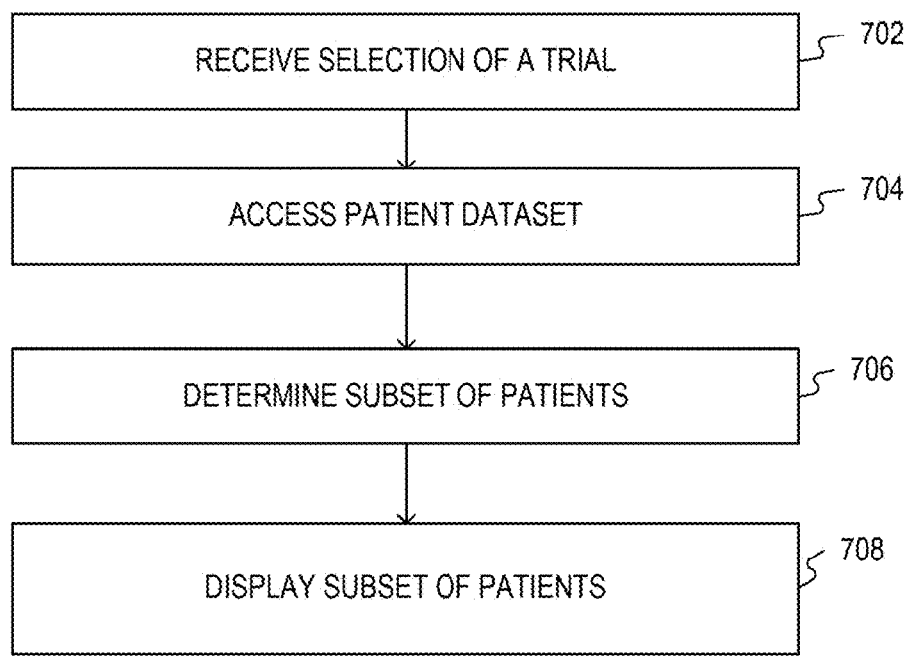
FIG. 7 is a flowchart illustrating an exemplary process for providing one or more suggested patients for a trial, consistent with the present disclosure.

FIG. 7 is a flowchart illustrating an exemplary process 700 for suggesting one or more patients for a trial, consistent with the present disclosure. While process 700 is described in connection with client device 101, one skilled in the art would understand that one or more steps of process 700 may be performed by other components of the system (e.g., computing device 102 or processor 151).

At step 702, client device 101 may receive a selection of a trial. For example, client device 101 may receive a user input via a user interface of client device 101 for selecting a trial. By way of example, the user may select a trial from a list of trials. In some embodiments, a user may search for a trial within a search interface (e.g., using a trial name, unique trial identifier, etc.).

At step 704, client device 101 may access a patient dataset. In some embodiments, client device 101 may access a patient dataset in response to a selection of the trial (e.g., at step 702). For example, an accessed patient dataset may be associated with a selected trial and/or trial criteria. Accessing a patient dataset may include retrieving a patient dataset from a database (e.g., database 103). In some embodiments, a patient dataset may be stored among a plurality of patient datasets at a database. By way of further example, client device 101 may send a request to retrieve a patient dataset from database 103 to computing device 102. In some embodiments, a request to retrieve a patient dataset may be formatted to include a unique patient information identifier or other information enabling computing device 102 to distinguish the requested patient dataset from among those stored at database 103.

At step 706, client device 101 may determine a subset of patients. In some embodiments, client device 101 may determine a subset of patients meeting criteria for a trial (e.g., a trial selected at step 702). For example, client device 101 may compare trial criteria and/or user-selected parameters to one or more patient profiles associated with different patients, to determine which patients may be suitable for a trial. Based on such a comparison, client device 101 may determine a subset of patient profiles, representing a subset of patients, within a set of patient profiles.

For example, determining a subset of patients may be based on at least a portion of a patient dataset, trial dataset, a likelihood of genomic testing, a genomic testing status, and/or a trial criterion. For example, a subset of patients may be determined based on a predicted or verified genomic testing status trial criterion (e.g., of a trial). In some embodiments, computing device 102 may use a patient dataset and/or genomic testing likelihood and/or genomic testing status to determine, from among a set of patients (e.g., represented by patient profiles stored at a database 103), patients for a subset. In some embodiments, a set of patients may be associated with a genomic testing status criterion (e.g., at least one genomic testing status criterion may be associated with a trial), which may be used in determining a subset of patients. For example, client device 101 may compare a genomic testing status (e.g., a predicted genomic testing status) with a genomic testing status criterion of a trial (e.g., "tested," "verified tested," etc.). In some embodiments, client device 101 may determine that the predicted genomic testing status of a patient satisfies the genomic testing status criterion of a trial (e.g., based on the comparison, client device 101 may determine that the predicted genomic testing status matches the genomic testing status trial criterion), and may then include that patient in the subset of patients, based on this determination. In some embodiments, client device 101 may determine that the predicted genomic testing status of a patient does not satisfy the genomic testing status criterion of a trial (e.g., based on the comparison, client device 101 determines that the genomic testing status does not match the genomic testing status trial criterion), and may then exclude that patient from the subset of patients, based on this determination.

At step 708, client device 101 may cause a display (e.g., at a display of client device 101) of a subset of patients for a trial (e.g., a subset determined at step 706). In some embodiments, computing device 102 may cause the display of a subset of patients for a trial at a client device 101. In some embodiments, causing display of a subset of patients may include displaying criteria of a trial and/or indicators of a patient qualification status for the criteria. As described with respect to other figures, displaying a subset of patients may include displaying at least one indicator, interactable element, etc., which may change dynamically based on updates to a patient dataset, a genomic testing status, at least one trial criterion, and the like.

Figure 8:
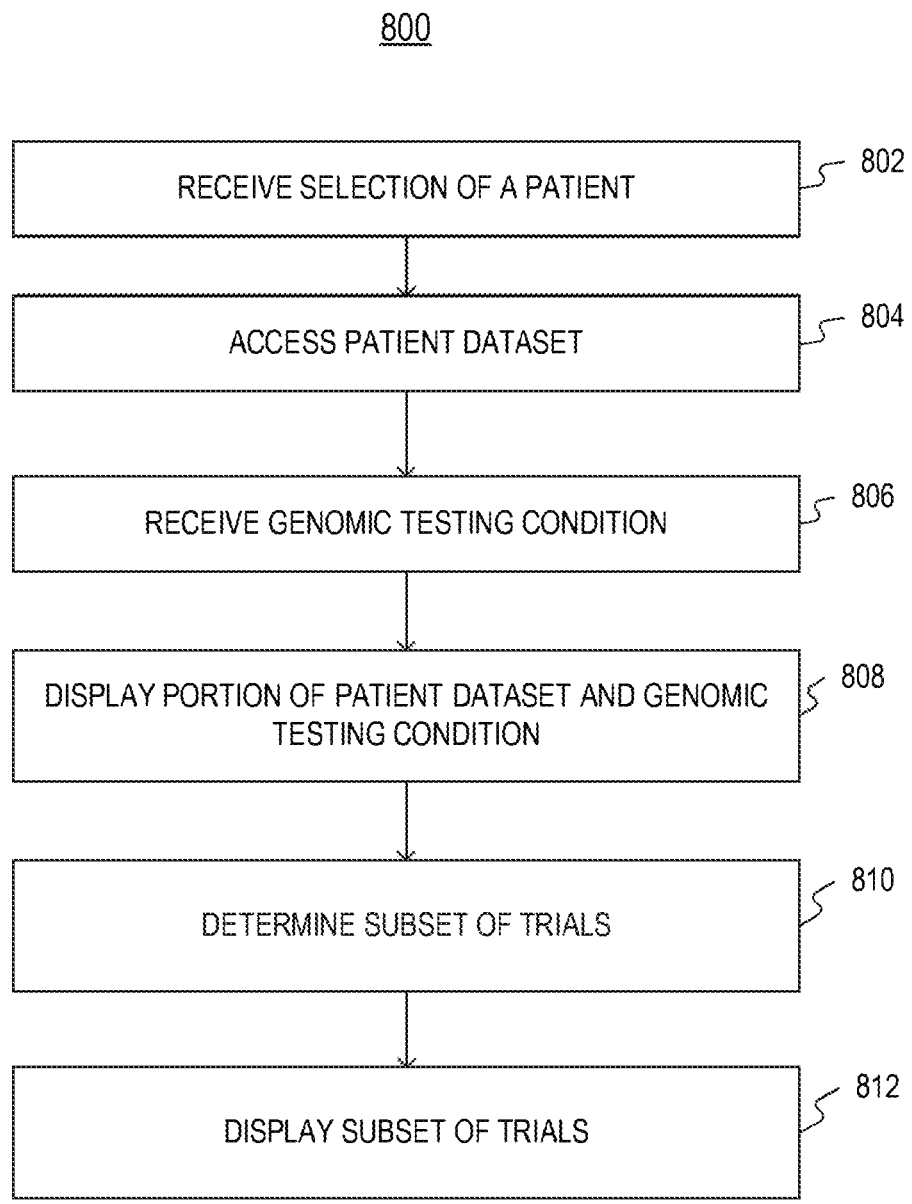
FIG. 8 is a flowchart illustrating an exemplary process for providing one or more suggested trials, consistent with the present disclosure.

FIG. 8 is a flowchart illustrating an exemplary process 800 for suggesting one or more patients for a trial, consistent with the present disclosure. While process 800 is described in connection with client device 101, one skilled in the art would understand that one or more steps of process 800 may be performed by other components of the system (e.g., computing device 102 or processor 151).

At step 802, client device 101 may receive a selection of a patient. For example, client device 101 may receive a user input via a user interface of client device 101 for selecting a patient. By way of example, the user may select a patient from a list of patients (e.g., within user interface 600C). In some embodiments, a user may search for a patient within a search interface (e.g., using a patient name, patient date of birth, unique patient identifier, etc.), such as user interface 600A prior to selecting a patient.

At step 804, client device 101 may access a patient dataset. In some embodiments, client device 101 may access a patient dataset in response to a selection a patient dataset in response to a selection of the patient (e.g., at step 802). For example, an accessed patient dataset may be associated with a selected patient (e.g., a genomic testing status and a patient identifier). Accessing a patient dataset may include retrieving a patient dataset from a database (e.g., database 103). In some embodiments, a patient dataset may be stored among a plurality of patient datasets at a database. By way of further example, client device 101 may send a request to retrieve a patient dataset from database 103 to computing device 102. In some embodiments, a request to retrieve a patient dataset may be formatted to include a unique patient identifier or other information enabling computing device 102 to distinguish the requested patient dataset from among those stored at database 103.

At step 806, client device 101 may receive a genomic testing status. In some embodiments, a received genomic testing status may be a verified genomic testing status or a genomic testing status based on a determined likelihood of genomic testing (e.g., as discussed in FIG. 3B). In some embodiments, a genomic testing status based on a prediction may be classified as "unknown" or "not enough information," such as in situations where a machine learning model determines it does not have sufficient input information to make a prediction. In some embodiments, a genomic testing status may be associated with a patient (e.g., a patient selected at step 802). A likelihood of genomic testing may have been predicted by a trained model configured to receive a patient record, which may include unstructured information. For example, computing device 102 may have received a patient record (e.g., from a client device 101, which may or may not be the same device performing a step of process 800), and may have applied a trained model to the record to extract information from the record and/or convert the record into a format having structured information. In some embodiments, a genomic testing status based on a prediction may include a degree of likelihood determined by the machine-learning model.

At step 808, client device 101 or computing device 102 may cause display of at least a portion of the patient dataset and a genomic testing status (e.g., a genomic testing status based on a prediction). For example, displayed portions may be displayed within a user interface (e.g., user interface 600C), consistent with disclosed embodiments. In some embodiments, the displayed portions may include a subset or entirety of the patient dataset accessed at step 802 and/or the genomic testing status received at step 806.

At step 810, client device 101 may determine a subset of trials for a patient. In some embodiments, determining a subset of trials for a patient may be based on at least a portion of the patient dataset or a likelihood of genomic testing and/or a genomic testing status (which may or may not be a same portion as of that in step 808). For example, a subset of trials may be determined based on a predicted likelihood of an occurrence of genomic testing or verified genomic testing status. By way of example, a first subset of trials may be determined based on a first genomic testing status (e.g., based on a predicted likelihood of an occurrence of genomic testing at a first time, and a second subset of trials may be determined based on a second genomic testing status (e.g., a verified genomic testing status) at a second time. In some embodiments, a subset of trials for a patient may be determined from a plurality of trials. By way of example, computing device 102 may use a patient dataset and/or genomic testing status to determine, from among a set of trials (e.g., stored at a database 103), trials for a subset. In some embodiments, a set of trials may be associated with a genomic testing status criterion (e.g., at least one genomic testing status criterion may be associated with each trial of the set), which may be used in determining a subset of trials. For example, client device 101 may compare a genomic testing status (e.g., a predicted genomic testing likelihood and/or status) with a genomic testing status criterion of a trial (e.g., "tested," "verified tested," etc.). In some embodiments, client device 101 may determine that the predicted genomic testing status satisfies the genomic testing status criterion of a trial (e.g., based on the comparison, client device 101 may determine that the predicted genomic testing status matches the genomic testing status criterion), and may then include that trial in the subset of trials, based on this determination. In some embodiments, client device 101 may determine that the predicted genomic testing status does not satisfy the genomic testing status criterion of a trial (e.g., based on the comparison, client device 101 determines that the genomic testing status does not match the genomic testing status trial criterion), and may then exclude that trial from the subset of trials, based on this determination.

At step 812, client device 101 may cause a display (e.g., at a display of client device 101) of a subset of trials for a patient (e.g., a subset determined at step 810). In some embodiments, computing device 102 may cause the display of a subset of trials for a patient at a client device 101. In some embodiments, causing display of a subset of trials may include displaying criteria of the subset of trials and/or indicators of a patient qualification status for the criteria. As described with respect to other figures, displaying a subset of trials may include displaying at least one indicator, interactable element, etc., which may change dynamically based on updates to a patient dataset, a genomic testing status, at least one trial criterion, and the like.

Machine Learning Model for Extracting Diagnoses, Treatments, and Key Dates

In some embodiments, the disclosed systems and methods may automate the analysis of medical records of a patient or patient population to identify dates associated with key events during the diagnosis and treatment of a patient. For example, researchers, physicians, clinicians, or other users may be interested in identifying patients diagnosed with a particular disease as well as an estimated date of the diagnosis, or patients being treated with a particular medication and dates associated with such treatment. This may allow users to efficiently make various determinations about individual patients within large populations based on analysis of EMRs. For example, a researcher may identify patients having been diagnosed with an advanced stage of a disease and the date of the advanced diagnosis, which may indicate whether the patients may be eligible for inclusion in a clinical trial or other form of cohort.

In order to efficiently extract a particular disease or treatment along with key dates and stages associated with the disease or treatment, a system may be configured to access a database storing medical records associated with one or more patients. A medical record may refer to any form of document including data regarding diagnosis and/or treatment of a patient. In some embodiments, a patient may be associated with more than one medical record. For example, a doctor associated with the patient, a nurse associated with the patient, a physical therapist associated with the patient, pathologist, radiologist, or the like, may each generate a medical record for the patient. These medical records may include either or both structured and unstructured data associated with the patient. Structured data may include quantifiable or classifiable data about the patient, such as gender, age, race, weight, vital signs, lab results, date of diagnosis, diagnosis type, disease staging (e.g., billing codes), therapy timing, procedures performed, visit date, practice type, insurance carrier and start date, medication orders, medication administrations, or any other measurable data about the patient. Unstructured data may include information about the patient that is not quantifiable or easily classified, such as physician's notes or the patient's lab reports. Unstructured data may include information such as a physician's description of a treatment plan, notes describing what happened at a visit, statements or accounts from a patient, subjective evaluations or descriptions of a patient's well-being, radiology reports, pathology reports, laboratory reports, etc.

In many cases, diagnosis information for a particular disease, or a stage of the disease or treatment information for a particular treatment and key dates, may be represented within the unstructured data and may not be explicitly tied to a particular date within the patient's medical record. For example, regarding a patient's diagnosis for metastatic non-small cell lung cancer (NSCLC), a physician may refer to the diagnosis in multiple notes before and after the diagnosis date. For example, prior to the advanced diagnosis, a physician may include notes such as "presents with NSCLC, no evidence of metastases" and "possible mets to liver." Various documents subsequent to the advanced diagnosis may include phrases such as "biopsy shows metastases to liver" and "patient with metastatic NSCLC." Thus, using conventional techniques, it may be difficult for an automated system to ascertain the exact date of the advanced diagnosis or the stages of the disease based on the notes. Similar issues may arise for treatment information associated with the disease. For example, prior to beginning a particular treatment for a disease, a physician may include notes indicating a diagnosis of the disease and/or notes indicating various treatment options were discussed with the patient. Subsequent to beginning a treatment, documents in the patient's record may indicate a response to the treatment but may not indicate a particular date on which the treatment began. Therefore, extracting exact dates of treatments may also be difficult using conventional techniques.

To overcome these and other difficulties, the disclosed systems and methods may extract snippets of text related to an event of interest. As used herein, a snippet of text may refer to a string of consecutive characters or words within a larger body of text. For example, if a medical record includes unstructured text data, a snippet may be a subset of text within the unstructured data. Following the example described above, this may include the snippets such as "presents with NSCLC, no evidence of metastases," "possible mets to liver," "biopsy shows metastases to liver," and "patient with metastatic NSCLC." These snippets may be identified in various ways. In some embodiments, this may be performed by searching for a set of keywords associated with a particular event. For example, this may include keywords such as "NSCLC," "lung cancer," "mets," "metastases," "metastatic," "spread," or various other words, symbols, acronyms, or phrases that may be associated with a particular event. A snippet may be defined as a string of text before and after these identified keywords. In some embodiments, the snippet may be a predetermined size. For example, the snippet may be a predetermined number of words or characters before and/or after the identified keyword. In some embodiments, non-substantive text, such as HTML tags, dates, pagination, or other text may be removed prior to extracting the snippets.

These sentences or snippets may then be tokenized and represented as a series of tokenized vectors. This may include dividing the snippet of text into a plurality of tokens. In some embodiments, each of the tokens may correspond to a word within a snippet. In other words, the tokens may be split according to word boundaries identified in the text, such that each token includes a word within the snippet. For example, the snippet "possible mets to liver," may be tokenized into "possible," "mets," and "liver." Tokens may be extracted in both directions from a keyword identified in a medical record and throughout the full snippet. In some embodiments, the tokens may comprise single words, as indicated above. In other embodiments, the tokens may be configured to include multiple words. For example, tokens associated with the term "BRAF neg" may be generated as "neg," "BRAF neg," and "BRAF." The present disclosure is not limited to any particular form or format of tokens extracted from the snippets.

These tokenized vectors may be processed to generate corresponding vectorized sentences. This may involve applying a gated recurrent unit (GRU) network followed by an attentional layer and a feedforward layer. An example process for generating these snippet vectors is described in U.S. Patent Publication No. 2021/0027894 A1, which is incorporated by reference herein in its entirety. These resulting snippet vectors may be input into a trained machine learning model as input vectors.

The system may further associate each input vector with a date. In some embodiments, this may include a date associated with a document from which the snippet was extracted. For example, if the snippet "biopsy shows metastases to liver" is extracted from a physician's notes dated Feb. 20, 2017, this date may be associated with the resulting input vector. Alternatively or additionally, various other dates may be associated with each input vector. For example, if the text within or surrounding a snippet includes a particular date, that date may be used in place of a document date. For example, if a snippet of "metastatic since Feb. 15, 2017" is found in a document dated Mar. 13, 2018, the February 2017 date may be associated with the snippet in place of the March 2018 date.

The resulting input vectors and the associated input dates may be input into a trained machine learning model configured to determine a particular disease and dates associated with the event of interest. In some embodiments, the trained model or models may include an artificial neural network. Various machine learning algorithms may be used, including a logistic regression, a linear regression, a regression, a random forest, a K-Nearest Neighbor (KNN) model (for example as described above), a K-Means model, a decision tree, a cox proportional hazards regression model, a Naïve Bayes model, a Support Vector Machines (SVM) model, a gradient boosting algorithm, or any other form of machine learning model or algorithm. While the description above refers to a process performed by two separate models, in some embodiments, this process may be performed by a single model, or may be performed by more than two models. In some embodiments, various word importance metrics such as term frequency—inverse document frequency (TFIDF) or other statistical may be implemented in association with the model.

In some embodiments, one or more query dates may be input into the model in addition to the input vectors and the input dates. Each query may represent a point in time at which the model should make a prediction. In some embodiments, the queries may be a range of dates. For example, the queries may be a series of weeks (i.e., represented as 7-day periods) encompassing the dates associated with the snippet vectors. For each of the queries, the model may generate a prediction of whether the date of interest occurred within the queried date range. While weekly queries are used by way of example, various other periods may be used. For example, the periods may be daily, several days, bi-weekly, monthly, yearly, or any other suitable period. As a result, the model may generate a distribution of probabilities over the range of query dates, with each query returning a probability of whether the date of interest occurred during that query.

To determine the probabilities for a given query, the model may analyze snippet vectors within several time windows relative to the query. For example, the time windows may be greater than 365 days before the query date, between 365 and 30 days before the query date, between 30 and 7 days before the query date, less than 7 days before the query date, within 7 days after the query date, between 7 and 30 days after the query date, between 30 and 365 days after the query date, and later than 365 days after the query date. These time windows are provided by way of example and any other suitable time windows may be used. For each time window, snippet vectors associated with input dates within that time window may be analyzed according to one or more aggregation functions. For example, the aggregation functions may include a "sum" function, a "mean" function, and a "LogSumExp" function.

The sum function may represent a sum of the input vectors associated with dates in the time window. For example, a matrix, M, may be generated as a vector of all of the input vectors for the model. A logical matrix, D, may be generated with elements indicating whether the corresponding input vectors are included within the time window such that multiplication of D*M results in sum of the relevant vectors. Similarly, the mean may represent an average value of the input vectors associated with the time window. For example, logical matrix D may be divided by its sum along the second dimension such that multiplication of D*M results in a mean of the relevant vectors. LogSumExp may be a smooth approximation to a maximum function (i.e., a "RealSoftMax" or "TrueSoftMax" function), defined as a logarithm of the sum of the exponentials of the arguments. For example, a torch.exp( ) function may be applied to matrix M and the resulting matrix may be multiplied with logical matrix D (as D*M). A torch.log( ) function of the resulting output may be applied.

As a result, for each time window, multiple aggregations may be generated for the input vectors associated with the time window. This may be repeated for each time window for a given query to generate an output vector for the query. This output vector may be input into a feed forward network (or similar form of recurrent neural network) to generate a probability of whether the date of interest occurred within the query date (or range of dates). Various other layers may be applied, such as a softmax layer, to generate the final probability. This probability may be represented in various formats. For example, the probability may be represented as a value within a range (e.g., from 0-1, 0-100, etc.), a percentage, a value within a graduated range of values (e.g., 0, 1, 2, 3, etc.), a text-based representation of probability (e.g., low probability, high probability, etc.) or the like. In some embodiments, the model may also output a probability of the date of interest not occurring within the query date, which may be an inverse of the other probability. For example, for a given query date, the model may output a probability 0.98 of the date of interest occurring within the query date and a probability of 0.02 of the date of interest not occurring within the query date. The process above may be repeated for each query to generate a probability distribution indicating a probability of when the date of interest occurred across a range of query dates. Various other outputs may be generated, such as an overall probability of the patient having been diagnosed with the particular disease, a confidence level associated with the distribution, or the like.

In some embodiments, the model may generate probabilities for multiple dates of interest. For example, continuing with the NSCLC diagnosis date example above, the model may output probabilities for each query date of whether the initial diagnosis for NSCLC occurred in that query date range and whether an advanced diagnosis (e.g., stage 3b or higher, lower stage with distant metastases, etc.) occurred in that query date range. Accordingly, for the output vector for each query multiple feed forward layers may be applied such that multiple probabilities that are generated.

While the disclosed systems and methods are generally described using the example of particular diseases and dates associated with diagnoses and various states of the disease, it is to be understood that the same or similar processes may be performed for other event dates. For example, this may include start and end dates for a particular treatment or therapy, whether a particular drug was taken along with dosages and dates, particular diagnostics being performed and associated dates, or the like. Further, various other inputs may also be provided to the trained model, such as document types, document format, or other document metadata.

In some embodiments, the disclosed embodiments may include training the model to determine whether a patient condition is present relative to a certain date. For example, the model may be trained by identifying a cohort of patients having a particular disease, identifying different stages of the disease and relevant diagnosis dates. For example, input to a model may include a set of sentences containing keywords related to advanced NSCLC and extracted from a patient's EHR documents. Each sentence may be associated with a date, using the document timestamp or, if present, a date mentioned explicitly in the sentence. The sentences may be processed by a GRU networks may be trained to predict the probability of each diagnosis for a sequence of time points, which can then used to extract whether the patient had been diagnosed with a particular disease and the diagnosis date(s) if so.

In some embodiments, the model may be trained for both diagnoses of a disease and treatment. For example, input to a model may include one or more sentences having keywords related to diagnosis of the disease as well as sentences having keywords related to treatment of the disease. The input may also include a training data set of dates associated with the diagnosis and treatment of the disease. For example, the training data set may include dates when the disease (or various stages of the disease) was diagnosed. Further, the training data set may include dates when particular lines of treatment began, as well as other dates associated with treatment (e.g., an increase in dosage, a change in treatment, etc.). The model may be trained using stochastic gradient descent or similar methods for training a model using a set of labeled training data. As a result, the trained model may be configured to extract a particular disease and/or treatment type, as well as dates associated with the diagnosis and treatment of the disease.

Predicting Biomarker Status and Testing Dates

As described above, the disclosed embodiments may include extracting snippets of text associated with an event of interest and associating each snippet with a date in order to estimate a date associated with the event, such as a date of interest. Such models may therefore focus on identifying text associated with a diagnosis and then ascertaining a date associated with the diagnosis. In some embodiments, a model may be developed to identify and extract dates from a document and then make a prediction as to whether the date is associated with an event. For example, a model may be developed to determine dates a patient tested positive for a particular biomarker. The model may then extract all dates from one or more documents and, for each date, make a prediction as to whether the date is associated with the biomarker. This may also include determining a result associated with the test, such as whether the patient tested positive or negative for the particular biomarker. Accordingly, rather than a high-level determination of whether a patient tested positive or negative for the biomarker, the disclosed embodiments may provide a detailed test-level results associated with one or more dates within a patient medical record.

In some embodiments, the disclosed model may be implemented as a combination of two or more sub-models which operate on documents associated with a patient. The first sub-model may predict whether a document indicates testing for condition and, if so, a result from the test. For example, the first sub-model may predict whether a document indicates testing for pre-defined protein as well as a percent staining result from the test. This model may operate by first identifying clinically relevant terms related to the condition in unstructured EHR documents and then extracting snippets of text surrounding the terms, as described above. As an illustrative example, For PDL1 testing in non-small-cell lung cancer, the model may extract one of five outcomes for the patient, alongside the test date: Not tested, Tested and the Percent Staining is <1%, Tested and the Percent Staining is 1-49%, Tested and the Percent Staining is >=50%, Tested and the Percent Staining is Unknown. Accordingly, the first model may be trained using a plurality of snippets labeled using similar values.

The second sub-model may predict a date associated with the text within a document. This model may similarly operate by extracting one or more dates within a document and a snippet surrounding this date. The model may then use this snippet of text to predict whether the date is a test result date or some other, unrelated date. The predictions from the two sub-models may then be combined: for each document which has evidence of testing for a particular condition, the result prediction from the first model may be joined with the test date prediction from the second model. Some embodiments may further include removing redundant tests predicted by the model using a rules-based method. For example, this may include aggregating predicted tests with the result which occur within a predetermined threshold time of one another (e.g., 30 days, 10 days, etc.) and removing any test with an "Unknown" result prediction within 30 days of a test with a non-unknown result.

The extracted values from the two sub-models may then be combined. For example, for each document showing evidence of a pre-defined biomarker testing, the extracted test results from the first model may be joined with the extracted test date from the second model. At this step the model may have provided extracted values looking at each document independently. The disclosed embodiments may include an additional step of aggregating these values them across documents to remove redundancies. For example, in some cases the same test can be documented multiple times in different documents. By aggregating these values, any duplicate results can be removed. Accordingly, the disclosed embodiments provide among other advantages, improved efficiency, convenience, and functionality over existing medical data analysis or processing systems.

In some embodiments, a system may be configured to access a database storing medical records associated with one or more patients. As described above, these medical records may include either or both structured and unstructured data associated with the patient. In many cases, testing information associated with a particular biomarker and dates associated with the testing, may be represented within the unstructured data. For example, the test may be indicated in a physician's description of test result, notes describing what happened at a visit, statements or accounts from a patient, subjective evaluations or descriptions of a patient's well-being, radiology reports, pathology reports, laboratory reports, etc.

As described above, a patient medical record may include multiple documents associated with the same patient. As an initial step, the disclosed methods may include performing a document-level prediction for each document as to whether the document indicates a patient has been tested for a biomarker (or whether the document is associated with another form of event of interest). For example, this may include the various methods above for determining whether a patient has been tested for a particular biomarker. In some embodiments, this may include inputting the document into a document-level machine learning model, which may be trained to determine whether the document indicates a patient has been tested for a particular biomarker, as described above. Various other methods may include performing a keyword search for a particular biomarker indicator, application of a percent staining model, or the like. The result of this analysis may be an indication of whether the document includes a discussion of the event of interest. In some embodiments, the result may be a binary indication of whether the patient has been tested or not. Additionally or alternatively, this may include generating a score (e.g., a percentage, etc.) indicating a likelihood the documents includes information relating to the event of interest. In some embodiments, other values such as "unknown" or "inconclusive" may also be used.

In some embodiments, documents may be categorized based on a result of a particular test. For example, throughout a diagnosis or treatment of a patient, tests may be performed to determine what percentage of cells test positive for hormone receptors, along with how well the receptors show up after staining. This may be referred to as a percent staining or staining intensity. Each document may be categorized into different groups of results. For example, this may include a group of less than 1% staining, a group of 1-50% staining and a group of greater or equal to 50% staining. Various other groups or ranges of staining may be used. While testing for a particular biomarker is used by way of example throughout the present disclosure, it is to be understood that the same or similar processes may be performed for other events of interest, including specific details about the progression of a disease or other aspects of a patient's treatment. For example, such events of interest may include diagnoses of particular diseases, diagnoses for particular stages of a disease, whether the patient has undergone a particular treatment, a stage or phase of treatment performed, details about a particular mutation, a number of copy variants, or the like. As an illustrative example, a human-abstracted dataset of biomarker testing results may include a result status (e.g. "Positive" or "Negative"), but this dataset may not be detailed enough for a particular purpose. For example, the U.S. Food and Drug Administration (FDA) often requires distinguishing between different mutations at the same gene or condition. Rather than re-abstract the entire dataset, the disclosed embodiments may be used to extract test dates and finer-detailed test results, and this machine learning-extracted data may be used to fill in missing mutation details in the abstracted dataset. Accordingly, other groupings may be specified based on the stage of diagnosis, or the like.

In order to identify testing dates (or other dates such as diagnosis dates, treatment dates, or the like) within a document, the system may perform a search to extract dates from one or more documents associated with the patient. In embodiments where the document-level prediction is performed, this search may only be performed on documents indicated as being tested for the biomarker (or associated with another event). For example, this may include comparing a score for the document to a predetermined threshold and analyzing documents with scores satisfying the threshold. In some embodiments, identifying the dates may include performing a search for particular keywords such as "date," "test[ed] on," month names, days of the week, or other keywords that may indicate dates. As another example, this may include searching for text having a particular format, such as "##/##/####," "[month] ##, ####," "20 ##," "19 ##" or various other formats that may be used to represent a date. In some embodiments, these dates may be tokenized across multiple documents. For example, if a date is referred to as 12/01/17 in one instance and Dec. 1, 2017 in another instance, these dates may be replaced with "DATE1" or some other tokenized reference to the date to ensure the date is represented to consistently.

Consistent with the disclosed embodiments, snippets surrounding the identified dates may then be extracted. For example, this may include extracting a snippet having a length of 10 words surrounding the date (e.g., 5 words before and after the date, etc.). Of course, various other snippet lengths and/or positions relative to the date may be used, depending on the particular implementation. In some embodiments, when the same date is referenced multiple times in the same document, the snippets associated with the multiple instances of the date may be combined or grouped together. For example, words within the snippets may be combined into a single snippet and duplicate words may be removed. Various other methods for combining snippets may be used. These sentences or snippets may then be tokenized and represented as a series of tokenized vectors, as described above.

The resulting input vectors and the associated input dates may be input into a trained machine learning model configured to determine a particular disease and dates associated with the event of interest. In some embodiments, the trained model or models may include an artificial neural network. Various machine learning algorithms may be used, including a logistic regression, a linear regression, a regression, a random forest, a K-Nearest Neighbor (KNN) model (for example as described above), a K-Means model, a decision tree, a cox proportional hazards regression model, a Naïve Bayes model, a Support Vector Machines (SVM) model, a gradient boosting algorithm, or any other form of machine learning model or algorithm. While the description above refers to a process performed by a single model, in some embodiments, this process may be performed by two or more models.

The disclosed embodiments may further include training the model to determine dates associated with the event of interest. For example, the model may be trained by identifying a cohort of patients having a particular disease where treatment dates for the disease are known. For example, the model may be trained on a dataset of patients in the identified data set for a specific disease for whom information has been extracted about testing for a pre-defined protein (e.g., testing for PD-L1 for people who have been diagnosed with non-small-cell lung cancer). During training, the input to this model may include all relevant unstructured electronic health record (EHR) documents. Snippets surrounding dates within the EHR documents may be extracted as described above. These snippets may further be labeled to indicate whether the corresponding date represents a date the patient received a particular test (or other patient event). For example, the snippet may be labeled as "1" to indicate the snippet includes a test date or "0," if not. A machine learning model may then be trained to learn whether a snippet is a test result date or not using the labels previously assigned. In some embodiments, the model may include multiple stages, as a machine learning pipeline. For example, this may include TFIDF word embedding and a Logistic Regression classifier, or similar components. As a result, the trained model may predict a likelihood that a date represents a date associated with a particular event, such as a date a patient is tested for a particular biomarker.

In some embodiments the output of the model may be represented as a confidence score indicating the likelihood of the date being associated with the event. For example, the confidence score may be a represented as a percentage, on a scale (e.g., 0-1, 0-100, etc.), or according to various other metrics. A prediction may then be made based on the score for each date. For example, this may include comparing the generated scores for each date to a predetermined threshold to identify dates determined to be associated with the event. In some embodiments, various post-processing may be performed before and/or after the prediction. For example, the system may be configured to analyze one date per document (e.g., the date associated with the highest confidence score, etc.). In some embodiments, if the same date is referenced in multiple documents, multiple predictions may be determined for that date. In some embodiments, the system may be configured to maintain only one prediction for the date. Accordingly, each date referenced in a document or plurality of documents may correspond to one prediction of whether the date is associated with an event. This may include only keeping the prediction associated with the document most likely to be associated with the event (e.g., based on a factor associated with the event, such as a highest percent staining, or other metric associated with the document).

In some embodiments, one or more dates may be removed at some stage of the process. For example, a document or series of documents may commonly reference a date of birth of the patient, which may be eliminated prior to further analysis of the dates. In some embodiments, the date of birth of the patient may be known (e.g., based on metadata, or structured data associated with the documents), or may be extracted from unstructured data. For example, this may include searching for keywords, such as "Date of birth," "DOB," "birthdate," or the like. While a birth date is used by way of example, various other date may be determined to be irrelevant and excluded from analysis, such as a date associated with a document, a date of initial diagnosis, or various other dates. In some embodiments, dates within a predetermined range may be eliminated. For example, if patient events occurring after a particular date are of interest (e.g., after an initial diagnosis, etc.), any dates prior to the particular date may be eliminated. Various other post-processing may be performed, such as keeping a weighted mean of dates or the like.

In some embodiments, multiple dates may be determined for each patient. For example, as described above, each document may be categorized into different groupings (e.g., based on a percent staining indicated in the document, or the like). Accordingly, a different date for each category or group may be determined. In some embodiments, the system may add in dates that appear to be missing from the results of the analysis described above. For example, the system may determine a patient-level determination of a particular percent staining (e.g., >=50% staining) or other determination. If no date is associated with this patient-level determination as a result of the model output, one may be generated and added to the results. For example, this may include inserting the timestamp of the document with the earliest reference to this particular percent staining.

While dates and/or corresponding scores are provided by way of example, one skilled in the art would recognize that the model may be configured to output various other types of data, which may depend on the particular implementation. In some embodiments the model may generate one or more values indicating whether a particular event (e.g., testing for a particular biomarker alteration) occurred and/or the result of the event. For example, the model may output a "positive" value indicating an biomarker alteration was reported, an "unknown" value if a test result is unknown, a "negative" value otherwise. As another example, the model may output a "positive" value if any alteration with an approved FDA indication was reported, an "unknown" value if the test result is unknown (e.g. due to missing documentation), or a "negative" value otherwise.

In some embodiments the model outputs may include additional values for more specific aspects of the result. For example, the model may output a "negative" value, an "unknown" value as described above, but a first "positive" value for a specific one or more genetic alteration (or other patient condition) and a second "positive" value for another genetic alteration. As another example, the model may be tailored to extract specific test results, such as ImmunoHistoChemistry (IHC) tests. For example, a model configured to extract IHC test results of the HER2 biomarker could output (1) "IHC 0" if there is a reported IHC 0 test result, (2) "IHC 1+" if there is a reported IHC 1+test result, and/or (3) "IHC negative, NOS" if there was a negative IHC test but the exact staining level of the HER2 biomarker is not known. As another example, the model may be tailored to extract percent staining results for an immunostaining test. For example, a model configured to extract PDL1 staining results on tumor cells could output (1) "Unknown" if the test's percent staining has not been reported, (2) "<1%" if a staining percent of less than 1% is reported, (3) "1-50%" if a percent staining between 1% and 50% is reported, or (4) ">50%" if a percent staining of more than 50% is reported. The various examples described above are provided by way of example and one skilled in the art would recognize various other types of outputs that may be generated.

Figure 9:
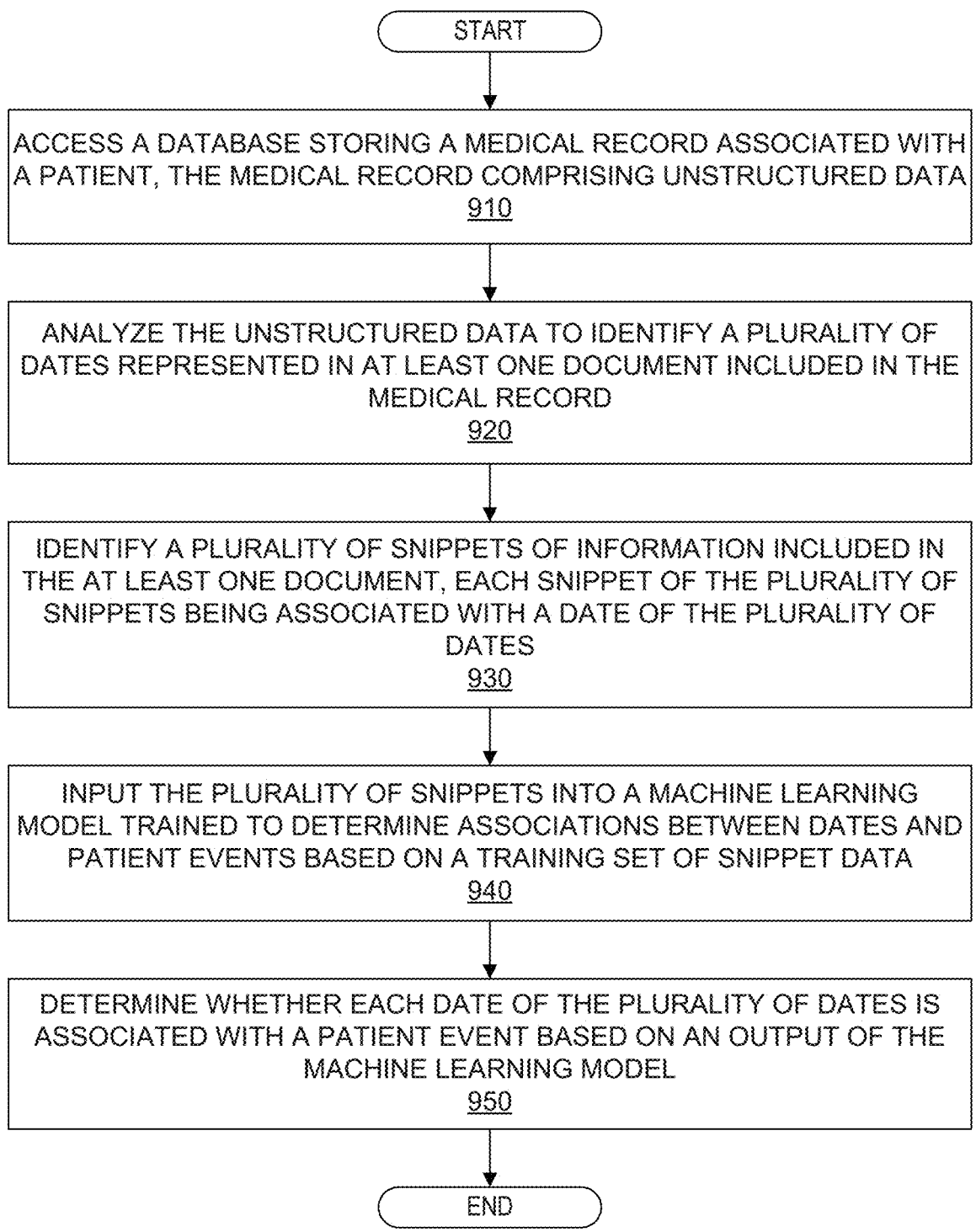
FIG. 9 is a flowchart illustrating an exemplary process for providing one or more suggested trials, consistent with the present disclosure.

FIG. 9 is a flowchart illustrating an exemplary process 900 for processing data using a trained model to determine a patient event date, consistent with the present disclosure. Process 900 may be performed by at least one processing device, such as processor 151, as described above. While process 900 is described in connection with client device 102, one skilled in the art would understand that one or more steps of process 900 may be performed by other components of the system (e.g., computing device 101-1, etc.). It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 900. Further, process 900 is not necessarily limited to the steps shown in FIG. 9, and any steps or processes of the various embodiments described throughout the present disclosure may also be included in process 900.

At step 910, process 900 may include accessing a database storing a medical record associated with a patient. For example, this may include accessing database 103, as described above. In some embodiments, the medical record may include unstructured data. For example, the medical record may include notes, reports, or other text-based data, as described above.

In step 920, process 900 may include analyzing the unstructured data to identify a plurality of dates represented in at least one document included in the medical record. As described above, this may include searching for predetermined keywords or date formats within the unstructured data. In some embodiments, a preprocessing step may be performed to select documents predicted to be associated with a particular event. In other words, the medical record may include a plurality of documents and process 900 may further include selecting the at least one document based on a determination that the at least one document is associated with the patient event. Accordingly, analyzing the unstructured data to identify the plurality of dates may include analyzing the selected documents and not analyzing one or more unselected documents. In some embodiments, the at least one document may be determined to be associated with the patient event based on application of an additional trained model to the plurality of documents In some embodiments, process 900 may further include determining at least one additional date not included in the plurality of dates. For example, the at least one additional date may be determined based on a timestamp of the at least one document, as described above.

In step 930, process 900 may include identifying a plurality of snippets of information included in the at least one document. Each snippet of the plurality of snippets being associated with a date of the plurality of dates. The snippets may be defined in various ways. For example, the snippets may be determined based on a predetermined number of characters or words before and after the identified dates, as described above. In some embodiments, one or more of the dates may be consolidated as described above. For example, step 930 may include grouping a first snippet and a second snippet from the plurality of snippets based on the first snippet and the second snippet being associated with the same date. In some embodiments, process 900 may further include generating a plurality of snippet vectors based on the plurality of snippets.

In step 940, process 900 may include inputting the plurality of snippets into a machine learning model. For example, the machine learning model may include a neural network, a logistic regression or various other types of machine learning models, as described above. In embodiments where process 900 includes generating a plurality of snippet vectors, step 940 may include inputting the snippet vectors into the machine learning model. In some embodiments, process 900 may further include removing at least one date prior to determining whether each date of the plurality of dates is associated with the patient event. For example, this may include removing duplicate dates or other dates may be removed.

In step 950, process 900 may include determining whether each date of the plurality of dates is associated with a patient event based on an output of the machine learning model. As described above, the patient event may include a test result, a diagnosis, a treatment, or various other dates associated with a patient.

According to some embodiments, the at least one document may include a plurality of documents, as described above. Process 900 may include categorizing each document of the plurality of documents based on a factor associated with the patient event. For example, the factor may include a testing status or a testing result. In some embodiments, determining whether each date of the plurality of dates is associated with the patient event may include aggregating at least a first date and a second date associated with the same category of the plurality of categories, as described in further detail above.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, Python, R, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering, repeating, inserting, and/or deleting steps. It is intended, therefore, that the specification and examples be considered as illustrative only, with a true scope and spirit being indicated by the following claims and their full scope of equivalents.

What is claimed is:

1. A model-assisted system for automatically processing medical records storing unstructured data to extract dates associated with a patient event, the system comprising:
    memory storing a machine learning model, the machine learning model trained to process one or more text snippets associated with at least one date and output a confidence score indicating a likelihood that the at least one date is associated with the patient event; and
    at least one processor programmed to:
        automatically extract a date associated with the patient event for each of a plurality of patients from the medical records, the extracting comprising:
            access, from a database storing the medical records, at least one document associated with the patient, the at least one document storing unstructured textual data of at least one healthcare provider note, at least one lab record, at least one pathology record, and/or at least one treatment plan, wherein the unstructured textual data comprises freeform text;
            identify a plurality of dates in the freeform text by identifying portions of the unstructured textual data that match a predetermined date format;
            extract, for each of the plurality of dates identified in the freeform text, a corresponding snippet of the unstructured textual data at least in part by extracting a predetermined number of words or characters before and/or after the identified date in the at least one document thereby obtaining a plurality of text snippets corresponding to the plurality of dates; and
            process the plurality of text snippets using the machine learning model stored in the memory to extract the date of the patient event, the processing comprising:
                generate, for each of the plurality of text snippets, a set of vectors representing the text snippet at least in part by:
                    dividing the text snippet into a plurality of tokens; and
                    generating vectors representing the plurality of tokens to obtain the set of vectors representing the text snippet;
                provide the sets of vectors representing respective text snippets of the plurality of text snippets as input to the machine learning model to obtain output comprising a plurality of confidence scores, the plurality of confidence scores each indicating a likelihood that a particular one of the plurality of dates is associated with the patient event; and
                determine the date associated with the patient event for the patient at least in part by selecting one of the plurality of dates using the plurality of confidence scores output by the machine learning model;
        store extracted dates associated with the patient event for the plurality of patients in the database in a predetermined structured format at least in part by storing the extracted dates in a field of the predetermined structured format designated for storage of patient event dates; and
        cause a user device to display a user interface displaying one or more of the extracted dates in the user interface at least in part by reading the one or more extracted dates from the field of the predetermined structured format.

2. The model-assisted system of claim 1, wherein the patient event comprises at least one of a test result, a diagnosis, or a treatment.

3. The model-assisted system of claim 1, wherein machine learning model includes an artificial neural network.

4. The model-assisted system of claim 1, wherein the machine learning model includes a logistic regression model.

5. The model-assisted system of claim 1, wherein the at least one processor is further programmed to divide each text snippet into the plurality of tokens by:
generating a token for each word in each text snippet.

6. The model-assisted system of claim 1, wherein the at least one processor is further programmed to select the at least one document from among a plurality of documents based on a determination that the at least one document is associated with the patient event.

7. The model-assisted system of claim 6, wherein the at least one processor is further programmed to identify the plurality dates by analyzing the at least one document to identify the plurality of dates without analyzing one more unselected documents of the plurality of documents.

8. The model-assisted system of claim 6, wherein the at least one processor is programmed to determine that the at least one document is associated with the patient event based on application of an additional trained model to the plurality of documents.

9. The model-assisted system of claim 1, wherein the at least one processor is further programmed to:
determine that a first one of the plurality of text snippets and a second one of the plurality of text snippets are both associated with a same date; and
group the first text snippet and the second text snippet from the plurality of text snippets based on the first text snippet and the second text snippet being associated with the same date.

10. The model-assisted system of claim 1, wherein the at least one processor is further programmed to:
remove at least one date from the plurality of dates identified in the unstructured textual data of the at least one document prior to determining the date associated with the patient event.

11. The model-assisted system of claim 1, wherein the at least one document includes a plurality of documents and wherein the at least one processor is further programmed to categorize each document of the plurality of documents based on a factor, separate from the at least one document, associated with the patient event.

12. The model-assisted system of claim 11, wherein the factor includes a testing status or a testing result.

13. The model-assisted system of claim 11, wherein determining the date associated with the patient event includes:
determining that a first one of the plurality of dates and a second one of the plurality of dates are both associated with a particular one a plurality of categories; and
aggregating at least the first date and the second date associated with the particular category.

14. The model-assisted system of claim 1, wherein the at least one processor is further programmed to:
determine at least one additional date not included in the plurality of dates; and
determine the date associated with the patient event by selecting the date from a set of dates including the plurality of dates and the at least one additional date.

15. The model-assisted system of claim 14, wherein the at least one processor is programmed to select the at least one additional date based on a timestamp of the at least one document.

16. A computer-implemented method for automatically processing medical records storing unstructured data to extract dates associated with a patient event, the method comprising:
using at least one processor to perform:
accessing, from memory, a machine learning model trained to process one or more text snippets associated with at least one date and output a confidence score indicating a likelihood that the at least one date is associated with the patient event;
automatically extracting a date associated with the patient event for each of a plurality of patients from the medical records, the extracting comprising:
accessing, from a database storing the medical records, at least one document associated with the patient, the at least one document storing unstructured textual data of at least one healthcare provider note, at least one lab record, at least one pathology record, and/or at least one treatment plan, wherein the unstructured textual data comprises freeform text;
identifying a plurality of dates in the freeform text by identifying portions of the unstructured textual data that match a predetermined date format;
extracting, for each of the plurality of dates identified in the freeform text, a corresponding snippet of unstructured textual data at least in part by extracting a predetermined number of words or characters before and/or after the identified date in the at least one document thereby obtaining a plurality of text snippets corresponding to the plurality of dates; and
processing the plurality of text snippets using the machine learning model accessed from the memory to extract the date of the patient event, the processing comprising:
generating, for each of the plurality text snippets, a set of vectors representing the text snippet at least in part by:
dividing the text snippet into a plurality of tokens; and
generating vectors representing the plurality of tokens to obtain the set of vectors representing the text snippet;
providing the sets of vectors representing respective text snippets of the plurality of text snippets as input to the machine learning model to obtain output comprising a plurality of confidence scores, the plurality of confidence scores each indicating a likelihood that a particular one of the plurality of dates is associated with the patient event; and
determining the date associated with the patient event for the patient at least in part by selecting one of the plurality of dates using the plurality of confidence scores output by the machine learning model;
storing extracted dates associated with the patient event for the plurality of patients in the database in a predetermined structured format at least in part by storing the extracted dates in a field of the predetermined structured format designated for storage of patient event dates; and
causing a user device to display a user interface displaying one or more of the extracted dates in the user interface at least in part by reading the one or more extracted dates from the field of the predetermined structured format.

17. The computer-implemented method of claim 16, wherein dividing each text snippet into a plurality of tokens comprises:
generating a token for each word in each text snippet.

18. The computer-implemented method of claim 16, further comprising:
selecting the at least one document from among a plurality of documents based on a determination that the at least one document is associated with the patient event.

19. The computer-implemented method of claim 16, wherein the method further comprises:
removing at least one date from the plurality of dates identified in the unstructured textual data of the at least one document prior to determining the date associated with the patient event.

20. A non-transitory computer-readable medium comprising instructions that, when executed by one or more processors, cause the one or more processors to perform a method for automatically processing medical records storing unstructured data to extract dates associated with a patient event, the method comprising:
accessing, from memory, a machine learning model trained to process one or more text snippets associated with at least one date and output a confidence score indicating a likelihood that the at least one date is associated with the patient event;
automatically extracting a date associated with the patient event for each of a plurality of patients from the medical records, the extracting comprising:
accessing, from a database storing the medical records, at least one document associated with the patient, the at least one document storing unstructured textual data of at least one healthcare provider note, at least one lab record, at least one pathology record, and/or at least one treatment plan, wherein the unstructured textual data comprises freeform text;
identifying a plurality of dates in the freeform text by identifying portions of the unstructured textual data that match a predetermined date format;
extracting, for each of the plurality of dates identified in the freeform text, a corresponding snippet of unstructured textual data at least in part by extracting a predetermined number of words or characters before and/or after the identified date in the at least one document thereby obtaining a plurality of text snippets corresponding to the plurality of dates; and
processing the plurality of text snippets using the machine learning model accessed from the memory to extract the date of the patient event, the processing comprising:
generating, for each of the plurality text snippets, a set of vectors representing the text snippet at least in part by:
dividing the text snippet into a plurality of tokens; and
generating vectors representing the plurality of tokens to obtain the set of vectors representing the text snippet;
providing the sets of vectors representing respective text snippets of the plurality of text snippets as input to the machine learning model to obtain output comprising a plurality of confidence scores, the plurality of confidence scores each indicating a likelihood that a particular one of the plurality of dates is associated with the patient event; and
determining the date associated with the patient event for the patient at least in part by selecting one of the plurality of dates using the plurality of confidence scores output by the machine learning model;
storing extracted dates associated with the patient event for the plurality of patients in the database in a predetermined structured format at least in part by storing the extracted dates in a field of the predetermined structured format designated for storage of patient event dates; and
causing a user device to display a user interface displaying one or more of the extracted dates in the user interface at least in part by reading the one or more extracted dates from the field of the predetermined structured format.

21. The model-assisted system of claim 1, wherein the machine learning model is trained using a labeled training dataset comprising:
a plurality of text snippets extracted from a plurality of documents storing unstructured textual data, each of the plurality of text snippets corresponding to a respective date and having a label indicating whether the respective date is associated with the patient event.

* * * * *